US006665665B1

(12) United States Patent
Ponte

(10) Patent No.: US 6,665,665 B1
(45) Date of Patent: Dec. 16, 2003

(54) COMPRESSED DOCUMENT SURROGATES

(75) Inventor: Jay Michael Ponte, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/365,326

(22) Filed: Jul. 30, 1999

(51) Int. Cl.⁷ .............................................. G06F 17/30
(52) U.S. Cl. ......................... 707/5; 707/4; 715/501.1; 715/513
(58) Field of Search ..................... 707/3–5, 10, 101, 707/102, 1, 100, 203, 513; 709/218, 219, 223, 226, 250; 713/153, 201; 715/513, 501.1; 717/151, 121, 168

(56) References Cited

U.S. PATENT DOCUMENTS

| | | | | |
|---|---|---|---|---|
| 5,764,906 A | * | 6/1998 | Edelstein et al. | 709/219 |
| 5,895,470 A | * | 4/1999 | Pirolli et al. | 707/102 |
| 5,915,249 A | * | 6/1999 | Spencer | 707/10 |
| 5,920,859 A | * | 7/1999 | Li | 707/10 |
| 6,029,195 A | * | 2/2000 | Herz | 707/10 |
| 6,038,561 A | * | 3/2000 | Snyder et al. | 707/6 |
| 6,094,649 A | * | 7/2000 | Bowen et al. | 707/3 |
| 6,122,647 A | * | 9/2000 | Horowitz et al. | 715/513 |
| 6,167,398 A | * | 12/2000 | Wyard et al. | 707/5 |
| 6,389,412 B1 | * | 5/2002 | Light | 707/3 |
| 6,405,188 B1 | * | 6/2002 | Schwartz et al. | 707/104.1 |

OTHER PUBLICATIONS

Wong, Clinton, "Example LWP Programs", *Web Client Programming with PERL*, O'Reilly & Associates, 1997, pp. 117–141.
Rocchio, J.J., Jr., "Relevance Feedback in Information Retrieval", *The Smart Retrieval System—Experiments in Automatic Document Processing*, Prentice Hall, Inc., N.J., 1971, pp. 313–323.

Callan, James P. et al., "The Inquery Retrieval System", Department of Computer Science, Univesity of Massachusetts.
Larkey, Leah S., "Combining Classifiers in Text Categorization", Center for Intelligent Information Retrieval, Department of Computer Science, University of Massachusetts, Amherst, MA.
Aronow, D.B., et al. "Automated Classification of Encounter Notes in a Computer Based Medical Record", Center for Intelligent Information Retrieval, Lederle Graduate Research Center, University of Massachusetts.
Lewis, David D., et al., "Training Algorithms for Linear Text Classifiers", AT&T Research, Center for Intelligent Information Retrieval, Dept. of Computer Science, University of Massachusetts.
Doug P's Review of Paper, "Information Retrieval Performance by Relevance Feedback", by Salton, Gerard et al., Dept. of Computer Science, Cornell University, Ithaca, N.Y.
Haines, David et al., "Relevance Feedback and Inference Networks", University of Massachusetts.
"Introduction to TCP/IP", Yale University, Feb. 2, 1995, Internet Article.

(List continued on next page.)

*Primary Examiner*—Shahid Al Alam
(74) *Attorney, Agent, or Firm*—Leonard Charles Suchyta; James K. Weixel

(57) ABSTRACT

Disclosed is a method and device for storing information about Web documents such as pages or sites in a manner which may be used in conjunction with inverted term lists to facilitate the retrieval of documents of interest from the Web. The method involves constructing compressed surrogates for documents, such that various operations may be performed without the need to retrieve a copy of the document from the Web. The method permits the efficient updating of inverted term lists when documents on the Web have been modified or deleted, and also permits the efficient processing of search queries in a variety of circumstances.

30 Claims, 14 Drawing Sheets

OTHER PUBLICATIONS

"How Search Engines Rank Web Pages", Internet Article, date unknown.
"How Search Engines Work", Internet Article, date unknown.
"A Helpful Guide to Web Search Engines", Internet Article, date unknown.
"How to USe Web Search Engines", Internet Article., Date unknown.
"How Search Engines Work", Internet Article, date unknown.

Aronow, D.B. et al., *Automated Classification of Encounter Notes in a Computer Based Medical Record*. Proc. of 8th World Congress on Med. Informatics, Vancouver, Canada (Jul. 1995), pp. 8–12.

* cited by examiner

| DOCUMENT # | DOCUMENT URL |
|---|---|
| 1 | URL 1 |
| 2 | URL 2 |
| 3 | URL 3 |
| ... | |

LOOKUP TABLE

| TERM # | TERM | ITL ADDRESS | NUMBER OF DOCUMENTS CONTAINING TERM | TFMAX |
|---|---|---|---|---|
| 1 | "TERM 1" | LOC. 1 | $N_1$ | $TF_{M1}$ |
| 2 | "TERM 2" | LOC. 2 | $N_2$ | $TF_{M2}$ |
| 3 | "TERM 3" | LOC. 3 | $N_3$ | $TF_{M3}$ |

LOOKUP TABLE

FIG. 8
(PRIOR ART)

COMPRESSED DOCUMENT SURROGATES

TECHNICAL FIELD

This invention relates to techniques for maintaining information about material on the World Wide Web, and more particularly to methods for maintaining such information for the purpose of facilitating the retrieval of Web pages of interest to a user which relate to electronic commerce.

BACKGROUND OF THE INVENTION

The Internet, of which the World Wide Web is a part, consists of a series of interlinked computer networks and servers around the world. Users of one server or network which is connected to the Internet may send information to, or access information on, any other network or server connected to the Internet by the use of various computer programs which allow such access, such as Web browsers. The information is sent to or received from a network or server in the form of packets of data.

The World Wide Web portion of the Internet consists of a subset of interconnected Internet sites which are characterized by containing information in a format suitable for graphical display on a computer screen. Each site may consist of one or more separate pages. Pages in turn frequently contain links to other pages within the site, or to pages in other Web sites, facilitating the user's rapid movement from one page or site to another.

Among the many sites on the Web are sites which are designed for electronic commerce purposes such as the sale of goods or services. Each such site may be located entirely on a single server, or may be divided between different servers. Electronic commerce is a fast-growing component of Web use.

The Web is so large that users frequently call upon specialized programs such as Web browsers or search engines to help them locate information of interest on the Web. These specialized programs may analyze information about Web sites in a variety of ways, select a set of Web addresses that are expected to meet the user's criteria, and present this list, often in rank order, to the user. Or the specialized program may directly connect the user to the address selected as meeting the user's criteria.

As the Web has grown larger, search engines and other methods of locating relevant pages or sites have become increasingly useful. This is true for potential purchasers of goods or services just as for other users. However, current methods of retrieving Web pages or sites of potential use all have significant shortcomings.

In order to provide a user with a useful list of Web pages devoted to electronic commerce that may be of interest to him, it is useful to be able to select in as efficient and accurate a manner as possible, from among the vast quantity of Web pages, pages which are parts of sites that permit the purchase of goods or services, or other electronic transactions. This is true for at least two reasons.

First, to the extent that it is not possible efficiently and accurately to select pages which are part of sites from which electronic commerce can be carried out, a potential electronic commerce user, seeking a list of electronic commerce pages or sites that may be of interest to him, will also receive too many pages or sites that are unrelated to electronic commerce. This will both waste his time, and frustrate him. Moreover, to the extent that pages that are part of electronic commerce sites are missed, the user will not receive as complete a list of potentially-useful electronic commerce Web pages or sites as otherwise.

Second, insofar as methods for analyzing user search queries and returning lists of potentially useful Web pages or sites do so by utilizing data bases that summarize the content of Web pages or sites, the methods can proceed most quickly, and can be most efficient in their use of computer storage capacity, if the data bases upon which they rely can be limited in scope to information about Web pages that are part of electronic commerce sites, rather than being required to contain information about a much larger set of Web pages. But for a data base to be so limited, it must rely upon an efficient and accurate method of determining what Web pages relate to electronic commerce, and therefore should be summarized in the data base.

In determining whether a page is part of an electronic commerce site, however, it is not always possible to rely exclusively on information on that page; it is sometimes useful to make the determination based upon the characteristics of other pages in the site. It is therefore useful to have a method to locate other pages that are part of the same site as a given page.

For smaller sites, which are contained on a single server, that is not difficult. It is a reasonable assumption that if multiple pages contain links to one another, and all reside on the same server, they are in fact all part of the same site. Hence, starting from a given page which is of interest, one can simply follow links to other pages that are on the same server, and conclude that all such pages are part of a site. That site can then be analyzed to determine if it is likely to be an electronic commerce site.

Increasingly, however, sites on the Web are becoming larger, as companies increasingly use the Web to facilitate large scale electronic commerce. A company may distribute a site over multiple servers. Thus, there is a need for a technique to determine whether pages on different servers in fact are part of the same site. If such a technique were available, it could be used to help determine what pages were part of an electronic commerce site.

Prior efforts to solve this problem have not been completely successful. If one simply assumes that two pages are parts of different sites if they are on separate servers, that leads to missing many pages in large sites which spread over multiple servers. And such large sites may be among the most useful sites, since they may be large electronic commerce sites created by large companies.

Nor is it useful to assume that any two sites that are linked are part of the same site. Experience demonstrates that many useful Web sites contain links to other sites. Thus, treating any pages linked as part of a single site would lead to vastly overestimating the size of a typical Web site. (Indeed, given the richness of links on the Web, it might well lead to a conclusion that most of the Web is a single site!)

Finally, it is not sufficient simply to conclude that all pages that share the same URL (uniform resource locator) server hostname are part of the same site. Portions of sites sometimes have different URL server hostnames.

One could imagine an effort to develop complex algorithms to analyze the content of pages that are joined by links, to attempt to determine based on that analysis whether the pages are part of a single site. However, any such effort would be complicated, slow to execute, and of limited accuracy, given the similarity of content between similar sites that may be linked in some circumstances, and on the other hand the variety of content that may be contained within a single site in other circumstances. There is thus a need for a simple, reasonably accurate, technique for quickly determining whether pages that are linked are part of the same site.

Nor is the need for such a technique limited to the problem of classifying Web pages as being part of electronic commerce sites or not. First of all, there are many other purposes besides electronic commerce for which it will be useful to be able to select, from among the overwhelming number of Web pages, a subset of pages that have some characteristic in common: pages limited to a particular technical field, for example, or pages permitting the downloading of software. And again it may be necessary for purposes of classifying pages as satisfying such a criterion or not, to consider the characteristics of the site of which the page is a part, not just the characteristics of the page in question in isolation.

Moreover, even in the context of attempting to select pages of interest from the Web as a whole, a specialized program such as a search engine may find it desirable to consider, not just the data or information on a particular page, but the data or information on other pages within the same Web site. Specialized programs such as search engines may consider factors such as how often a given term occurs on a Web page, where on the page it is located, how close that term is located to another term, and whether other terms are located on the page, or in close proximity. In addition, however, it may be useful for the specialized program to be able to analyze the occurrence of terms, not just on the immediate page, but on the remainder of the site. By considering such additional information, a specialized program may be able to refine its analysis, and thus may be able to provide more useful results to the user. Thus, for this reason as well it is useful to have a quick and accurate method of finding other pages that are part of the same Web site as a specific page being analyzed.

As the Web has grown to encompass more and more material, another shortcoming in current methods of retrieving Web pages has become apparent, and this shortcoming is of concern for electronic commerce purposes as well as for other purposes. The more material the Web contains, the more difficult it becomes for a user to formulate a specific search criterion that returns useful pages or sites ranked in order of potential interest to him, without returning so many pages or sites that he is overwhelmed.

Efforts to circumvent this problem to date have not been completely successful. Users may conduct multiple searches, starting anew each time, but this is wasteful of their time, and frustrating, and their later efforts may be no more successful than their initial ones. Users may try to guess how to modify a prior search to yield more useful results, but such efforts too may be unsuccessful, leaving users to spend substantial amounts of time sifting through material that is not of interest to find the minority of useful material. Another problem is that if a search fails to locate certain useful material, the user may not even be aware that that has happened.

Users may respond to these problems by abandoning efforts to search for sites of interest to them, and instead simply responding to advertising that highlights certain sites, or responding to lists of sites that are created, not based upon the utility of the site to that user, but based upon payment by the site for inclusion in the list. But such methods of site selection may not produce the sites that would be most useful to the user, and also may leave the user feeling that his interests have been subordinated to those of advertisers and others.

These problems in efficiently finding the sites of most use to the user may discourage people from taking full advantage of Web resources, and in particular from using the Web for electronic commerce purposes. Thus there is a recognized great need for more effective information retrieval (IR) techniques.

Prior efforts have been made to improve the efficiency and yield of search processes, for electronic commerce as well as for general Web search purposes, by improving the mathematical algorithms that conduct the searches, and by paying attention to more factors than simply the presence or absence of specified terms in the page or site of interest. For example, efforts have been made to consider how often other pages or sites link to a given page or site, as a measure of how highly to rank a page or site. Or users presented with an initial list may be offered the opportunity to select a single page or site on the returned list and request additional pages or sites similar to that one. But none of these efforts has been fully successful. Moreover, they all share a single common deficiency. Because when they begin users often do not know exactly what they want, or where the material they want is most likely to be located, they may be unable to describe the target of their search with any precision. Thus, any such algorithm, no matter how sophisticated, can only yield results of limited usefulness. There is thus a need for a technique for improving the usefulness of results returned by Web search algorithms, and in particular for a technique with application in the field of electronic commerce.

Another group of shortcomings in current methodology that limits the ability to provide useful lists of electronic commerce sites to potential users is the difficulty in maintaining in a conveniently and quickly usable form information about pages or sites on the Web. It is generally believed that an efficient specialized program for generating lists of useful Web pages or sites in response to user inquiries must utilize information about Web pages or sites that is stored in data bases accessible to the specialized program. It is recognized that a new full search of the Web in response to each inquiry would take excessive time and computer resources to be feasible for most purposes.

Inverted term lists are frequently utilized to store information about Web pages or sites in a database, to avoid the need for a full Web search in response to a user inquiry. An inverted term list may be prepared for each term present in the collection of pages or sites being analyzed. (Hereinafter, for simplicity, "document" shall be used to refer to the items, such as pages or sites, in the collection being analyzed. A "term" may be any word, number, acronym, abbreviation or other collection of letters, numbers and symbols which may be found in a fixed order in a document.) Alternatively, lists may be prepared for all terms except certain common words, referred to as stop words, such as "the" or "and". Alternatively, lists may be prepared only for a specialized subset of terms of special interest, such as technical terms in a particular field, or names. Finally, the inverted term lists may attempt to maintain information about all pages or sites on the Web, or they may maintain information only about certain pages or sites that are determined to be of potential interest, such as pages or sites relating to electronic commerce.

An inverted term list for a term may contain information about the overall occurrence of that term in a collection of documents being analyzed. The information which may be maintained in an inverted term list for a given term may include information such as the total number of documents in the collection in which that term occurs, the total number of occurrences of that term in the document collection, and the maximum number of occurrences of that term in any single document in the collection, among other things. (Alternatively, some or all of this information may be stored in a lookup table which also contains the address of the inverted term list for the term in question.)

An inverted term list also will include information about the occurrence of that term in particular documents in the collection. For each document in the collection in which that term occurs, the inverted term list may include information about the location of the document in the collection, or a reference to a lookup table where such information is stored. The inverted term list may also include the number of occurrences of that term in that document. In addition, the inverted term list may include other information about the occurrences of that term in that document, such as the locations in that document of its occurrences.

An inverted term list may be stored in the form of a linked list or as an array. In a linked list, there may be a header containing the general information that is not specific to a particular document, such as but not limited to the number of occurrences of the term in the collection of documents as a whole, if that information is not maintained in the lookup table. In the linked list there may also be one link for each document in which the term appears. In this arrangement, each link in an inverted term list will contain the location of a document in the collection in which that term appears, together with such information about the occurrence of that term in that document as is being maintained, and the address of the next link in the inverted term list. (To save storage space, rather than containing the URL of a document, the inverted term list may contain the address in a lookup table at which the URL is stored. To further save storage space, the inverted term list may store that lookup table address relative to the lookup table address of the prior document in the inverted term list, rather than as an absolute address.)

Inverted term lists are helpful for many techniques for searching large collections of documents for documents of interest. For example, a user may wish to retrieve documents (Web pages or sites) from the Web which contain a particular word. However, the Web is so large that it is not desirable to conduct a full new search of the Web for documents containing the specified word in response to the request. Inverted term lists resolve that problem. If a user specifies a particular word of interest, it is simply necessary to consult the inverted term list for that word, and to refer the user to all documents on the list. It is also possible to list the documents in the inverted term list such that those that use the desired word more often are placed at the top of the list; this may help the user find the most useful document more quickly.

More complicated requests also may be handled with inverted term lists. For example, if a user wishes documents in which two particular words occur, it is simply necessary to consult the inverted term lists for both words, and to refer to the user any documents which are found on either list. Again, documents that may be more useful may be placed higher on the list of useful documents, according to considerations such as but not limited to how many occurrences they have of the desired words.

Other varieties of searches can also be accommodated by means of inverted term lists. For example, one can respond to a request for documents that contain one specified word but not another specified word by consulting the inverted term lists for the two words, and after ranking documents according to how often they contain the desired word, lowering the ranking of documents which contain the undesired word.

Current techniques for Web searching and retrieval that do not maintain information about documents in the collection in an accessible data base, other than by means of inverted term lists, pose problems. In particular, they do not organize and maintain information by the underlying document, rather than by the terms of interest. This leads to a number of problems in providing useful lists of documents in response to user inquiries, which will now be discussed. While these problems occur in other contexts as well as in the context of electronic commerce, they are of particular concern to those trying to provide accurate and efficient search techniques for the retrieval of electronic commerce information.

One problem that results from the failure to maintain information organized by the underlying document is the difficulty of maintaining accurate and up to date inverted term lists. This is a problem because, in order for inverted term lists to be useful, they must be reasonably accurate. If the collection of documents which they describe is static, that is not a problem. If, however, as in the case of the Web, and electronic commerce in particular, the collection is dynamic, with documents being modified or even deleted frequently, inverted term lists can quickly become inaccurate.

This is a problem because, when a user makes a request, and inverted term lists are used to determine which documents may be responsive, incorrect documents will be returned if there have been changes in underlying documents in the collection which are not reflected in inverted term lists. Hence a user will be referred to documents that are not of interest to him, while he is not referred to other, potentially useful, recently-modified documents. Moreover, insofar as other indices or collections of information are maintained to facilitate responding to queries or otherwise providing information to users, it is important that the information in the inverted term lists be kept synchronized with the other information.

In order to avoid these problems, one may wish to update inverted term lists whenever any documents in the collection which are indexed are modified or deleted. This process may be very time consuming. The reason is that, in the absence of any information stored in an accessible data base with respect to specific documents, indicating what terms were contained in the document before its modification or deletion, whenever that document is modified or deleted every inverted term list must be searched individually to determine if that document was located in it. In the case of document collections as extensive as the Web, or even simply of all electronic commerce sites on the Web, there are a very large number of inverted term lists, and many of the inverted term lists may be very long. Thus, it is a long process to search all inverted term lists for a document. And this lengthy process may be repeated each time any document in the collection is changed.

Some prior efforts to avoid this problem have been unsatisfactory. For example, one might choose to increase the efficiency of the process by using a batch process: updating inverted term lists to reflect changes in more than one document at a time. In this approach, rather than just looking for the occurrence of one particular document in an inverted term list at a time, and updating the list to reflect changes in that document, one might simultaneously look for the occurrence of a number of documents, and make changes to the list to reflect changes to all of those documents at the same time. This process has the advantage of reducing the computer resources that must be devoted to the process of updating lists, but the disadvantage is that significant resources are still consumed, and moreover grouping changes introduces delays in the updating process which reduce the accuracy of the results produced when the inverted term lists are used in responding to search queries. It would thus be useful, in the specific context of electronic commerce as well as generally, were there an efficient method of determining, when a document has been modified or deleted, which inverted term lists contained the document, so that the changes to the inverted term lists can be made efficiently and immediately.

Other problems also stem from the fact that conventional methods generally do not store information in a manner which is organized by document. For example, in the course of various methodologies for choosing documents anticipated to be useful to a user, it may be useful to calculate the score a given document will achieve under a particular search query. Under conventional methods, where no information is stored by document in a data base, it is necessary, in order to calculate a document score, to consult an inverted term list for each term in the search query, and to search within each such inverted term list to determine if that term occurs in the document in question. It could be more efficient if in calculating the document score one could avoid consulting inverted term lists for terms which do not occur in the document.

There is a further problem that occurs as a result of the fact that some conventional methods do not store information in a manner organized by document. It is recognized that searches for useful documents can take a relatively long time to process. This is because as the search criteria become complicated, more and more inverted term lists need to be referenced. Moreover, as the underlying document collection becomes bigger, each inverted term list becomes longer, including as it does all references to the term in question in the document collection. An inverted term list is likely to be particularly long if the term in question is relatively common.

Prior efforts to address this problem include refusing to permit the use of common words as part of a search inquiry. As noted above, words such as "the" or "and" may be omitted. Other common words, however, can be of use in narrowing down the search to more useful documents. For example, it might be of interest to find all documents referring to the occurrence of "osteoporosis" in "women." While searching on "osteoporosis" alone will produce these documents, it may also produce many extraneous documents. It would thus be useful to use the word "women" to refine the search. But this word is very common, and hence is likely to occur in many documents. There is thus a need for a method of making complex searches which include many terms more efficient.

In addition, in view of the difficulty that users sometimes have in initially formulating search queries that effectively return documents of interest, without also returning many extraneous documents, as discussed above an iterative technique by which an initial search query could be repeatedly modified based upon feedback from the user as to the relevance of documents on the list could be of use. Insofar as such techniques would modify search queries based on the characteristics of documents judged to be relevant, it is useful to have a method of maintaining information on the characteristics of documents, so that it is not necessary to find the document on the Web and analyze it from scratch each time it is identified as relevant (or irrelevant) in the process of such an iterative search.

BRIEF DESCRIPTION OF DRAWINGS

The above-mentioned and other features of the invention will now become apparent by reference to the following description taken in connection with the accompanying drawings in which:

FIG. 8 illustrates conventional (prior art) lookup tables which may be used in conjunction with inverted term lists.

SUMMARY OF THE INVENTION

Figure 1:
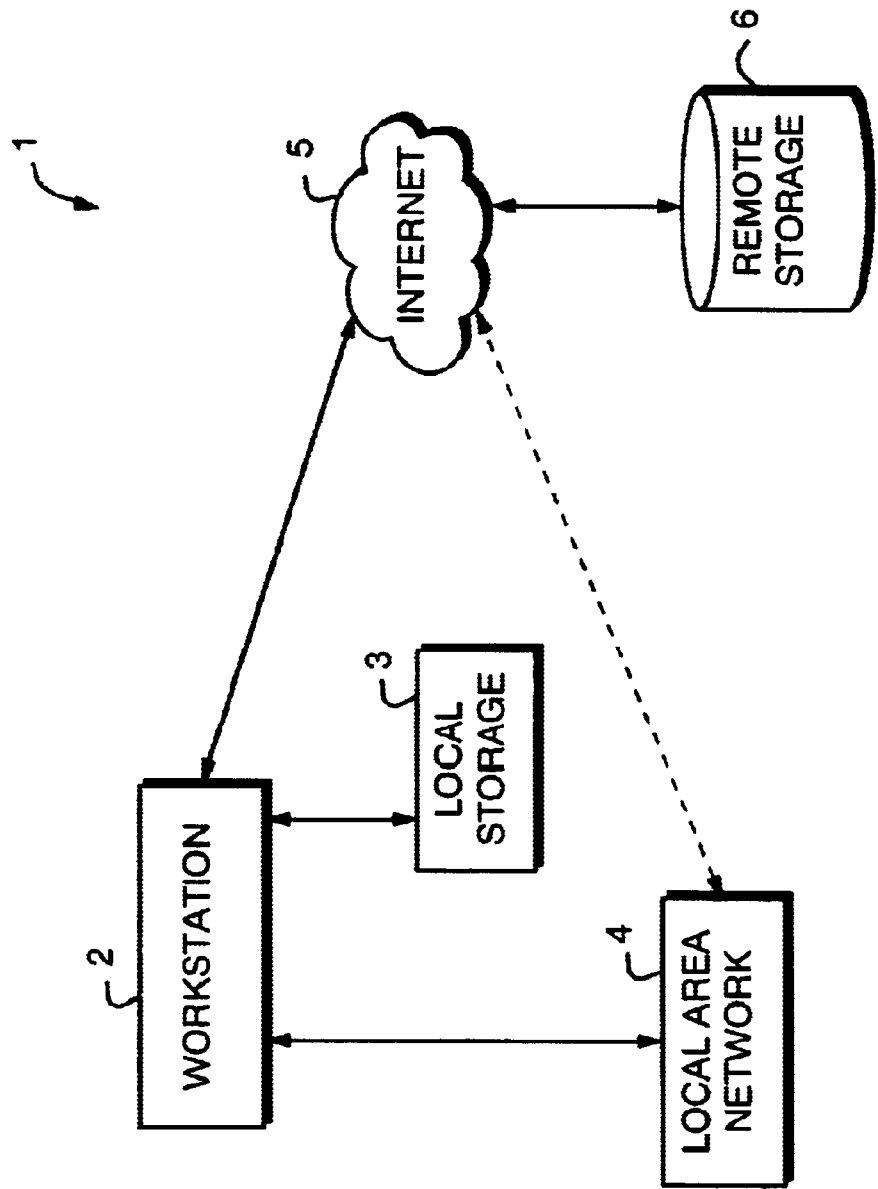
FIG. 1 is a schematic diagram of a computer system that may be operated according to the present invention.

According to the present invention, maintaining information about documents in a data base includes (a) creating a compressed document surrogate for each document in the data base, and (b) inserting in the compressed document surrogate information about terms which occur in the document. The documents may consist of Web pages or Web sites. Some embodiments include creating inverted term lists that contain information about terms which occur in the data base in conjunction with creating the compressed document surrogates. In some embodiments, the compressed document surrogates and inverted term lists contain information about the same terms, those terms being all terms which occur in the data base, or those terms being a subset of all terms, excluding common words.

The information about each term included in a compressed document surrogate for a document may include at least one of: a term identification number, a location in a lookup table of an entry for the term, an address of an inverted term list of the term, an address of a location in the inverted term list for the term of the document, a number of times the term occurs in the document, and a location in the document of each occurrence of the term. Information about each term included in a compressed document surrogate for a document may include a term identification number for each term found in the document. The information about each term included in a compressed document surrogate for a document may include the number of occurrences of the term in the document. The terms may be stored in the compressed document surrogate in term identification number order. The term identification number of a term in the compressed document surrogate may be given relative to the term identification number of the prior term in the document.

The information about terms may be stored in a lookup table which is a fixed array in which information about terms is stored in term identification number order. The information the lookup table stores may include at least one of: the term in a natural language, the address of the inverted term list of the term, the number of documents in the database which contain the term, and the maximum term frequency score for any document on any inverted term list for the term. The information the lookup table stores may also include the term in a natural language, the address of the inverted term list of the term, the number of documents in the database which contain the term, and the maximum term frequency score for any document on any inverted term list for the term. In some embodiments, there are two inverted term lists for each term: a top inverted term list containing information about the documents which contain the term most frequently, and a remainder inverted term list containing information about all other documents which contain the term.

According further to the present invention, modifying a collection of inverted term lists includes (a) creating a compressed document surrogate for each document in a data base which the collection of inverted term lists summarizes, the compressed document surrogate for a document containing information sufficient to identify each term which occurs in the document for which there is an inverted term list; (b) updating the collection of inverted term lists, when a document in the data base which the collection of inverted term lists summarizes is modified or deleted, by using the compressed document surrogate for the document to determine which terms for which there are inverted term lists were in the document, and updating the inverted term lists to reflect a modification or deletion, as well as updating the inverted term lists to reflect terms added to the document that were not previously in the document.

Information about each term may be included in a compressed document surrogate for a document, including at least one of: a term identification number, a location in a lookup table of an entry for the term, an address of an inverted term list of the term, an address of a location in the inverted term list for the term of the document, a number of times the term occurs in the document, and a location in the document of each occurrence of the term. Information about the terms may be stored in the compressed document surrogate in term identification number order, and the term identification number of a term in the compressed document surrogate may be given relative to the term identification number of the prior term in the document.

According further to the present invention, maintaining a data base with information about a collection of documents, to facilitate determining which documents may be of interest, where the documents in the collection may be modified or deleted from time to time, includes (a) choosing some or all of the terms found in the collection of documents to be indexed, (b) for each term chosen, preparing an inverted term list or inverted term lists, the list or lists containing desired information about the term's occurrence in the collection of documents, (c) for each document in the collection, preparing a compressed document surrogate, the surrogate including a list of each term, for which there is an inverted term list, which occurs in the document, together with additional desired information about the occurrence of said term in said document, (d) when a document in the collection which the set of inverted term lists summarizes is modified or deleted, updating the set of inverted term lists, by consulting the compressed document surrogate for said document to determine which terms for which there are inverted term lists were in said document, and updating the inverted term lists corresponding to those terms to reflect the modification or deletion in the document, as well as updating the inverted term lists to reflect terms added to the document that were not previously in the document, (e) when it is desired to determine which documents may be of interest from the data base, specifying terms which are desired to be found in documents, and/or which are desired not to be found, determining what documents contain the desired and undesired terms, and how often the terms appear in the documents, by consulting the inverted term lists for the desired and undesired terms, and preparing a list of documents ordered depending upon the occurrence of the desired or undesired terms.

A unique term identification number may be assigned to each term, and a compressed document surrogate containing the term identification number of each term contained in the document. The information may be being stored in the compressed document surrogate in order of term identification number, and the term identification number of a term may be given relative to the prior term identification number, rather than as an absolute number. A compressed document surrogate may contain the number of times the term occurs in the document. The inverted term lists may contain a document identification number for each document in which the term appears, and the number of times the term occurs in the document. Documents may be listed in an inverted term list in order of their term frequency scores. In some embodiments, two inverted term lists may be maintained for each term, a top inverted term list containing information about the documents in which the term occurs most frequently, and a remainder inverted term list containing information about the remaining documents in which the term occurs.

A lookup table may be maintained where, for each term, the term in a natural language, the address of each inverted term list for the term, the number of documents containing the term, and numbers reflecting the maximum amount the term can contribute to the score of a document on each of the term's inverted term lists, when processing a search query. The lookup table may be a fixed array with information about terms stored in order of term identification numbers. An inverted term list for a term may contain information about the location within a document of each occurrence of the term in question. The locations within the document of each occurrence of the term in question may be given in relation to the prior occurrence of the term in the document, rather than as an absolute value.

According further to the present invention, determining the score for a document under a search query which specifies terms that are desired to be present or absent includes (a) creating a compressed document surrogate for each document in the data base, which compressed document surrogate contains information about each term, from among the terms of interest of interest in the data base, which occurs in the document, and which compressed document surrogate is created in conjunction with inverted term lists that contain information about the terms of interest in the data base, and where the information about each term included in the compressed document surrogate for a document includes at least one of: the term identification number of the term, the location in a lookup table of an entry for the term, the number of times the term occurs in the document, the location in the document of each occurrence of the term, the address of the inverted term list of the term, and the address of the location in the inverted term list for the term of the document, (b) consulting the compressed document surrogate for the document whose score is to be determined, (c) for each term contained in said compressed document surrogate, consulting an inverted term list for that term, and/or a lookup table, and calculating the contribution to the document score resulting from said term, and (d) determining the total document score by adding the contributions of each term in the compressed document surrogate. The invention further comprises at step (c) the inverted term list not being consulted.

According further to the present invention, returning a list of a desired number of documents N in order of predicted utility, from among a collection of documents, as predicted by a search query containing terms desired to be present or absent, includes (a) creating a compressed document surrogate for each document in the data base, which compressed document surrogate contains information about each term, from among the terms of interest of interest in the data base, which occurs in the document, and which compressed document surrogate is created in conjunction with top and remainder inverted term lists that contain information about the terms of interest in the data base, and where the information about each term included in the compressed document surrogate for a document includes at least one of: the term identification number of the term, the location in a lookup table of an entry for the term, the number of times the term occurs in the document, the location in the document of each occurrence of the term, the address of the inverted term list of the term which contains the document, and the address of the location in the inverted term list of the document, (b) choosing, from among the terms in the search query which are desired to be found in documents, the term whose top inverted term list has not yet considered, which occurs in the fewest documents in the collection, (c) consulting the top inverted term list for said term, calculating the score for each document found in the top inverted term list, (i) if the document has not previously been found on an inverted term list, assigning the document the calculated score, (ii) if the document has previously been found on an inverted term list, increasing its previously-calculated score by the calculated score, (d) calculating the maximum score $S_{Max}$ that could be achieved by a document, not already found on a top inverted term list, if it is found on all top inverted term lists, for terms desired to be found in documents, not yet consulted, (e) calculating the maximum score $S_{Sub}$ that could be required to be subtracted from a document score, as a result of said document being found to contain terms desired to be absent from a document, (f) determining whether there are N or more documents already found, with scores such that if $S_{Sub}$ were subtracted from their scores, the remainder would be greater than $S_{Max}$, (g) if there are N or more such documents, determining by use of the compressed document surrogate for each document the final score for the documents that have so far been found in any inverted term list of a desired term, and providing a list of the N documents with the highest scores, ranked in order of score, (h) if there are not N or more such documents, repeating steps (b) through (f) until either N or more such documents are found, or until no top inverted term list of a term desired to be found in the document has not been analyzed, (i) if there are not N or more such documents, and the top inverted term lists of all terms desired to be found in the document have been analyzed, repeating steps (b) through (h) utilizing remainder inverted term lists instead of top inverted term lists, until either N or more such documents are found, or until no remainder inverted term lists of terms desired to be found in the document has not been analyzed, (j) determining by use of the compressed document surrogate for each document the final score for the documents found on the inverted term lists of the desired terms, and providing a list of the documents ranked in order of score. In some embodiments, only terms desired to be found being contained in a search query, so that $S_{Sub}$ is zero.

According further to the present invention, choosing documents of interest from a collection of documents includes (a) determining an initial selection criterion, (b) applying the initial selection criterion to each document in the collection, to generate a rank-ordered list of documents, (c) if further refinement of the list is desired, evaluating a subset of the documents on the list to determine whether each document in the subset is relevant, (d) modifying the selection criteria by at least one of: adjusting weights assigned to each element of the selection criteria in the prior iteration, removing elements of the selection criteria from the prior iteration, and adding additional elements to the selection criteria, based upon features of the documents determined to be relevant, by use of compressed document surrogates for the documents found to be relevant, where said compressed document surrogates comprise information about the use of terms in the documents found to be relevant, (e) applying the modified selection criterion to each document in the collection, to generate a new rank-ordered list of documents, (f) repeating the steps of (c), (d), and (e) until the classification is sufficiently accurate for use.

In some embodiments, when the modified selection criterion are applied to each document in the collection at step e, to generate a new rank-ordered list of documents, the compressed document surrogates for the documents being utilized to calculate the final document scores. The initial selection criteria may be arbitrarily chosen. The documents classified may be one of: electronic commerce Web pages and electronic commerce Web sites. The modification of the selection criteria at step d may include at least one of: adjusting a weight assigned to each element of the selection criteria in the prior iteration, removing elements of the selection criteria in the prior iteration, and adding additional elements to the criteria, based upon features of the documents determined to be irrelevant as well as features of the documents determined to be relevant, by use of compressed document surrogates for the documents found to be relevant and irrelevant, where said compressed document surrogates comprise information about the use of terms in the documents found to be relevant and irrelevant. The modification of the selection criteria may include (g) giving each term found in the collection of documents a score based upon how often the term occurs in documents determined to be relevant, compared to how often the term occurs in the collection of documents as a whole, and based upon how often the term occurs in documents determined to be irrelevant, compared to how often the term occurs in the collection of documents as a whole, (h) choosing terms with the highest positive weights thus determined to be the terms in the selection criteria, and (i) weighing the terms in the selection criteria according to the scores achieved in the above process, and the relative frequency of the terms in the collection.

Some embodiments include a score $W_T$ given to a Term T at step a being determined by a specified formula, including a probability that the term T occurs in a page determined to be relevant, and a probability that the term T occurs in a page determined to be irrelevant. The terms chosen at step b may be the terms whose scores $W_T$ exceed an average score $W_T$ by two or more standard deviations. The weights $S_T$ assigned to terms at step c may be determined by a specified formula including a number of documents in the collection, a number of documents containing the term T in the collection, and constants. In applying the modified selection criterion to each document in the collection, to generate a new rank-ordered list of documents, documents may be ranked in order of their scores $S_D$, as determined by a specified formula comprising $S_T$, and Robertson's term frequency for Term T in Document D.

According further to the present invention, identifying documents in a collection as having a particular characteristic includes (a) choosing an initial list of documents from among the documents in the collection, (b) evaluating a subset of the documents on the list to determine whether each document in the subset has the characteristic, (c) modifying the selection criteria by at least one of: adjusting the weights assigned to each element of the selection criteria in the prior iteration, removing elements of the selection criteria in the prior iteration, and adding additional elements to the criteria, based upon features of the documents determined to have the characteristic, and based upon features of the documents determined not to have the characteristic, by use of compressed document surrogates for the documents, where the compressed document surrogates include information about the use of the terms in the documents found to have the characteristic or not to have the characteristic, (d) applying the modified selection criterion to each document in the initial list of documents, to generate a new rank-ordered list of documents, (e) repeating the steps of (b), (c), and (d) until the classification is sufficiently accurate, (f) choosing a cutoff score to be applied; (g) concluding that all documents in the collection with scores above the cutoff score have the characteristic.

In some embodiments, the modification of the selection criteria at step c include (a) giving each term found in the subset of documents a score based upon how often the term occurs in documents determined to have the characteristic, compared to how often the term occurs in the subset of documents as a whole, and based upon how often the term occurs in documents determined not to have the characteristic, compared to how often the term occurs in the subset of documents as a whole, (b) choosing terms with the highest positive weights thus determined to be the terms in the selection criteria, and (c) weighing the terms in the selection criteria according to the scores achieved in the above process, and their relative frequency in the subset. Some embodiments include a score $W_T$ given to a Term T at step a being determined by the specified formula described above. The terms chosen at step b may be the terms whose scores $W_T$ exceed an average score $W_T$ by two or more standard deviations. The weights $S_T$ assigned to the terms at step c may be determined by the specified formula described above. In applying the modified selection criterion to each document in the subset, to generate a new rank-ordered list of documents, documents may be ranked in order of their scores $S_D$, as determined by the specified formula described above. The particular characteristic for which sites are being evaluated may include being an electronic commerce site.

Detailed Description of the Preferred Embodiment(s)

Referring to FIG. 1, a computer system 1 includes a workstation 2 having local storage 3. The workstation may also be connected to a local area network 4 and may access to the Internet 5. The Internet 5 may include or be coupled to remote storage 6. The workstation 2 may be any one of a variety of commercially available computers capable of providing the functionality described in more detail below. The local storage 3 may include ROM, RAM, a hard disk, a CD, or any other media capable of containing data and/or programs for the workstation 2 or other data. The local area network 4, which is coupled to and exchanges data with the workstation, may also contain data and/or program information for use by the workstation 2. The Internet 5 may be accessed in a conventional manner by the workstation 2. Alternatively, the workstation 2 may access the Internet 5 through the local area network 4, as shown by the dotted line of FIG. 1. The remote storage 6 may also contain data and/or program information for the workstation 2 or may contain other information, as will become apparent from the description below.

An aspect of the invention takes advantage of the methods by which network and server addresses on the Internet are assigned. This aspect makes it possible to determine quickly and efficiently whether two linked pages are part of a same site. Building on that technique, it is possible to find other pages that are part of a same site as a given page. Finally, it is possible to determine, for a given page, whether the page is part of a site with certain desired characteristics, such as but not limited to being an electronic commerce site.

Communication between servers and networks attached to the Internet is controlled by a series of protocols. The Internet Protocol (IP) is responsible for moving a data packet from node to node in the Internet until the packet reaches the correct destination server. In order to make this possible, each server attached to the Internet is assigned a unique IP address of the form a1.a2.a3.a4, where each number a1, a2, a3 and a4 is a single byte that is expressed as a decimal number in the range from 0 to 255.

Generally, a small network connected to the Internet will be assigned a unique address consisting of the first three bytes, and in turn will assign each server in the network (up to 256) a unique fourth byte. Thus, all servers on the small network will share the same first three bytes in their addresses, but will differ in the last byte.

Larger networks connected to the Internet will be assigned a unique address consisting of the first two bytes, and in turn will assign servers in the network addresses which consist of the last two bytes. Thus, in these larger networks all servers will share the first two digits of their address, and will have differing addresses in the last two bytes. However, within these networks it is frequently convenient to assign the third byte according to department or other organizational subunit, while the fourth byte represents an individual server. Thus, in these networks servers within a single department or other organizational unit will share the first three bytes of their address in common.

One aspect of the present invention takes advantage of this regularity in assignment of IP addresses to quickly find whether two linked pages are part of a same Web site. This aspect of the invention may be brought into use when a user, such as but not limited to a specialized program, such as a Web robot or Web crawler, finds a Web page that is or may be of interest, and wishes to determine for use in analyzing the page or pages whether the page is part of the same site as another page to which it is linked.

The specialized program may be of the type often referred to as a Web robot or Web crawler, of the kind familiar to those of ordinary skill in the art and as described in Web Client Programming with PERL, by Clinton Wong (O'Reilly & Associates 1997), pages 117 to 141. (As used herein, the phrases "Web robots" and "Web crawlers" are intended to be synonyms, and each to suggest the characteristics commonly associated with either term.)

Among the circumstances where it may be desired to utilize the present invention, after a specialized program has found a Web page of interest, is in the course of collecting information for a data base that will be used to permit the rapid identification of Web pages of interest according to different criteria. Examples of such data bases include, but are not limited to, collections of inverted term lists. The specialized program may wish to treat two Web pages which are part of a single site as a single unit in adding entries to inverted term lists, or it may wish to treat each page separately, but include in adding an entry for a page in an inverted term list information concerning another page.

Another circumstance where it may be desired to use the present invention is in locating other pages that are part of the same Web site as a given page.

Another circumstance where it may be desired to use the present invention is in determining whether a given page is part of a site with certain desired characteristics, such as but not limited to being an electronic commerce site.

Other circumstances where it may be desired to use the present invention will also be apparent to one of ordinary skill in the art.

Under the prior art, a user may determine if one page which is linked to another is part of a same Web site as the other page by comparing IP addresses of servers upon which the two linked pages reside. If the IP address of a server upon which one of the pages resides is the same as the IP address of a server upon which the other page resides, it is known in the prior art that the two linked pages can be classified as being part of the same site.

The present invention consists of going one step further, and treating the two linked pages as part of the same site if the first three bytes of the IP addresses of servers upon which the two pages reside are the same, even if the fourth bytes, representing the individual servers, are different. Thus, the invention takes advantage of the fact that IP addresses that share the first three bytes are likely either to be in the same small network, or in the same department or other subunit of a larger network, to conclude that linked pages on servers with such a relationship to each other are part of the same site.

The user then may conclude by determining that the two linked pages are part of the same site. Alternatively, the user may (but need not) continue the process to achieve further objectives.

Figure 2:
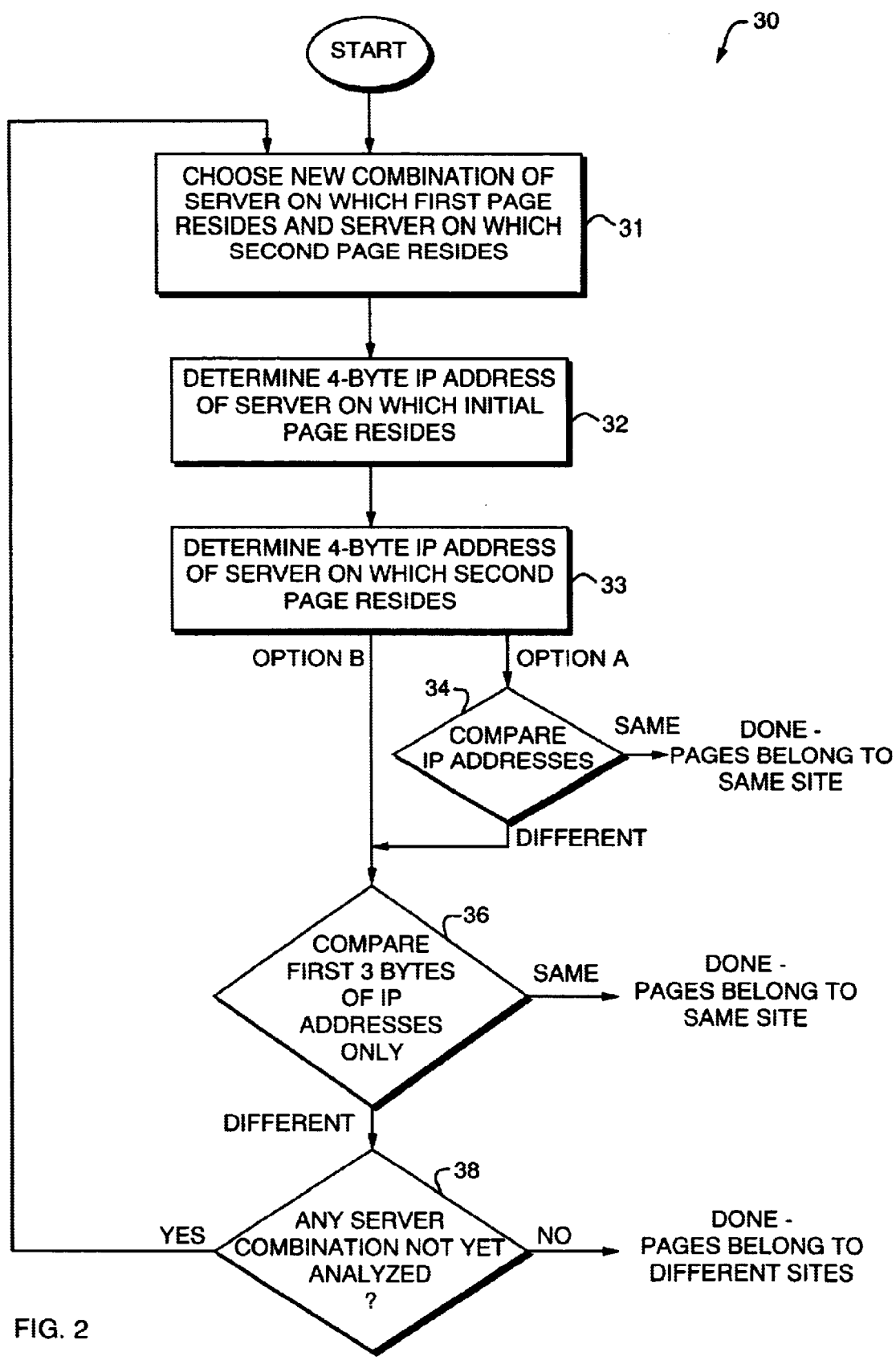
FIG. 2 is a flow chart illustrating the process, according to the present invention, of determining if two linked Web pages are part of a same Web site.

This aspect of the present invention is illustrated by the flow chart of an address-comparing process 30 in FIG. 2. At a first step 31, a server on which one of the pages resides is chosen, and a server on which the other page resides is chosen. (It will be recognized by one of ordinary skill in the art that either or both of the pages may reside on more than one server.) At a step 32, the four-byte IP address of the server on which resides one of the two linked pages being analyzed is determined. Methods of doing so are well known to those of ordinary skill in the art. A next step 33 in the process 30 consists of determining the four-byte IP address of the server on which resides the other page. There is then a choice.

Under one option (labeled Option A on FIG. 2), the process 30 may proceed to a next step 34, which is optional, where the four-byte address of the server on which the second page resides is compared to the four-byte address of the server on which the initial page resides. It is known in the prior art that if these addresses are the same, the pages reside on the same server. In such a case, the pages can be treated as being part of the same site with good confidence. Accordingly, at the step 34, if the addresses are the same, the address-comparing process 30 concludes that the pages are part of the same site, and the process 30 concludes.

However, according to the present invention, if the four-byte addresses of the servers are not the same in the step 34, the address-comparing process 30 does not conclude that the pages are in different sites. Instead, control passes to a step 36 to compare the first three bytes of the addresses of servers upon which reside the two pages.

Under a second option (labeled Option B on FIG. 2), according to the system described herein, the step 34 may be omitted entirely and control may pass from the step 33 directly to the step 36 to compare the first three bytes of the server IP addresses immediately upon carrying out the steps 32, 33 wherein the server addresses are determined.

As discussed above, if the first three bytes of the IP addresses of servers on which the pages reside are found to be the same, it is reasonable to conclude that the pages are on separate servers but within a small network, or are in the same organizational or other unit within a big network. Accordingly, if it is found at the step 36 that the first three bytes of the server IP addresses are the same, it is concluded that the two pages are part of the same site.

If the three bytes of the two server IP addresses are different, the process cannot conclude that the pages are part of the same site. However, because pages may reside on more than one server, finding that one particular server on which a given page resides does not share the same first three bytes of its IP address with one particular server on which the other page resides, does not mean that the two pages cannot be parts of the same site. Other servers on which the two pages reside must be compared. Accordingly, if at the step 36 the process 30 determines that the first three bytes of the IP addresses of the servers being analyzed are not the same, control passes to a step 38 at which it is determined whether there are other combinations of servers on which the two pages reside that have not yet been analyzed. If there are no unanalyzed combinations, the address-comparing process 30 concludes that the two pages are in different sites. However, if unanalyzed combinations remain, control passes back to the step 31 for the choice of another combination of servers to be analyzed.

In the preferred embodiment, the option described as Option B is followed, so that upon the two IP addresses being determined, control passes to the step 36 directly from the step 33 to compare the first three bytes of the IP addresses only.

Figure 3:
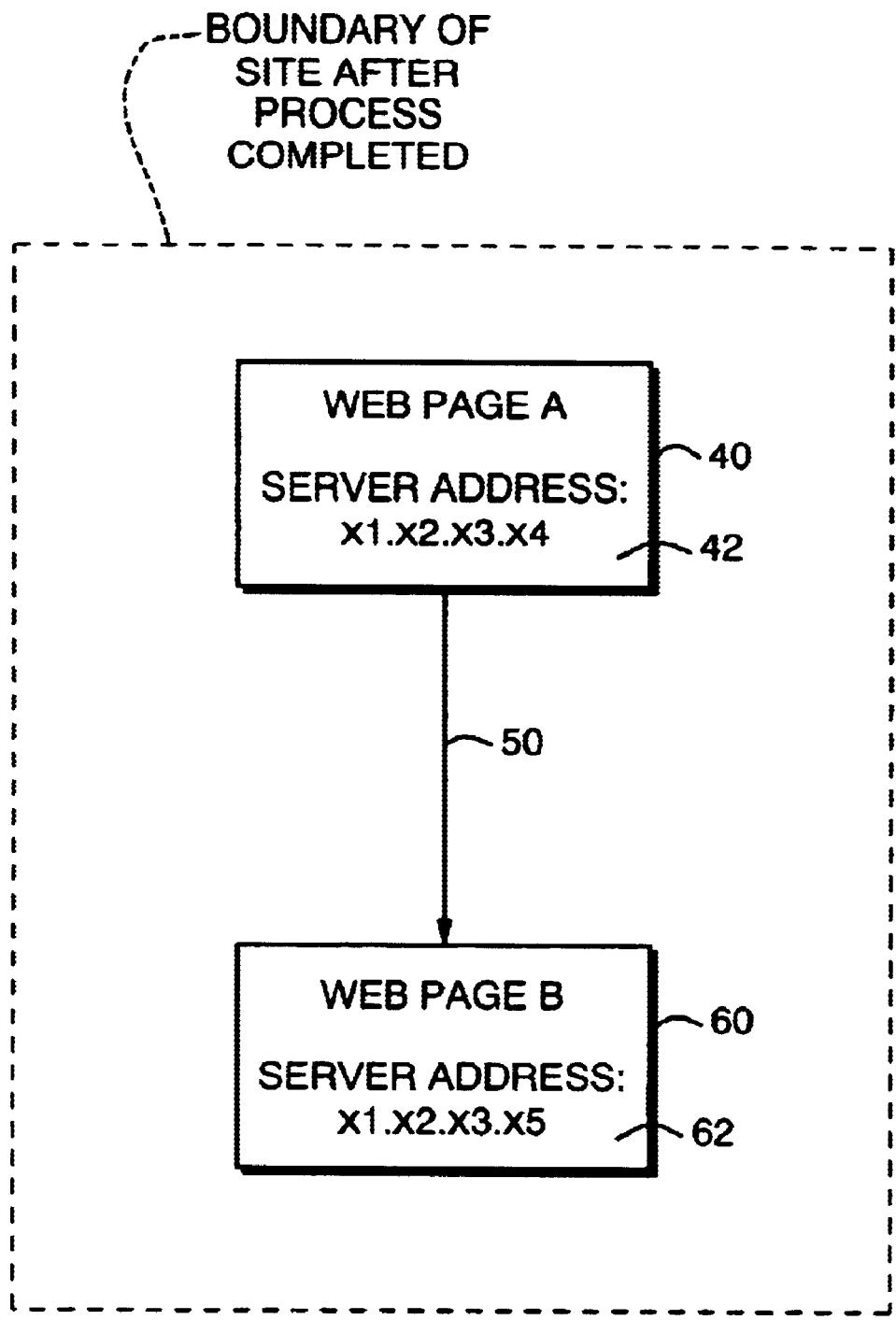
FIG. 3 is an example of two linked Web pages which can be analyzed according to the present invention to determine whether they are part of a same site.

The working of the overall process of FIG. 2 in the preferred embodiment may be illustrated on an actual assemblage of two Web pages by reference to FIG. 3 in conjunction with the following Table 1, in a case where each page resides on only a single server:

1 Step 31: Choose Server on Which First Page 40 Resides and Server on Which Second Page 60 Resides 2 Step 32: Determine Address 42 of Server Upon Which Page 40 Resides 3 Step 33: Determine Address 62 of Server Upon Which Page 60 Resides 4 Step 36: Compare First 3 Bytes Of Addresses Only First 3 Bytes of Address 62 are the Same as Those For Address 42

5 Conclude Page 60 is Part of Same Site as Page 40

Table 1—Steps in Analyzing Web Pages in FIG. 3

The process 30 begins at the step 31 by choosing an (only) server on which a page 40 being analyzed resides and an (only) server on which a page 60 being analyzed resides. The process continues at a step 32 by finding that the server upon which resides the page 40 has an address 42. In this example, the address 42 is x1.x2.x3.x4. The process continues at the step 33 by finding that the server upon which resides the page 60 to which the page 40 is linked by a link 50 has an address 62, which is x1.x2.x3.x5. According to the invention, the process 30 continues to the step 36, where it is found that the two pages 40, 60 are part of the same site because the first three bytes of the addresses 42, 62 of the servers upon which reside the pages 40, 60 are the same: x1, x2, and x3, even though the addresses 42, 62 of the servers on which the pages 40, 60 reside have different fourth bytes (x4as opposed to x5). (It will be recognized by one of ordinary skill in the art that where, as in the example being illustrated here, each Web page resides on only a single server, the step 31 of the process 30 has no effect, since there is no choice to be made, and the steps 32 and/or 33 may be omitted if the IP addresses of the servers are already known.)

A further aspect of this invention now permits the user to carry out the process of determining whether two linked Web pages are part of a single site in a systematic fashion for the purpose of finding other pages that are part of a same site as a given page. Among the circumstances where it may be desired to utilize this aspect of the present invention, after the specialized program has found a Web page that may be of interest, is in the course of collecting information for a data base that will be used to permit the rapid identification of Web pages of interest according to different criteria. Examples of such data bases include, but are not limited to, collections of inverted term lists. A specialized program may wish to treat Web pages which are part of a single site as a single unit in adding entries to inverted term lists, or it may wish to treat each page separately, but include in adding an entry for a page in an inverted term list information concerning another page.

Other circumstances where it may be desired to use the present invention will also be apparent to one of ordinary skill in the art.

This aspect of the invention is carried out by using a specialized program in a systematic fashion to begin from an original page, and to choose a link from the original page to a different page. The link chosen is processed according to the aspect of the invention described hereinabove, to determine if the different page to which the chosen link points is part of a same Web site as the given page. The process then continues, repeatedly choosing a link from a page that is part of the same Web site as the given page (including the given page itself), and processing the chosen link to determine if the page to which the chosen link points is part of the same Web site as the given page, until no links from any Web pages that are part of the same Web site as the given page remain which have not been processed. When no links remain which have not been processed, the processing ends.

It will be understood by one of ordinary skill in the art that in the course of this process a link may be reached which points to a page previously found during the process. It is not necessary to process more than one link to any page.

As will further be understood by one of ordinary skill in the art, there are numerous algorithms which may be utilized to determine, after processing one link is completed, how to choose a next link for processing. Any suitable algorithm may be used, which permits all links from pages determined to be part of a given Web site as a given page to be analyzed.

In particular, among the algorithms which may be used are those which proceed in a "horizontal" manner. Such algorithms first analyze a link from the given page. Once such algorithms have analyzed one link from a page, they analyze all links from the page before analyzing any links from another page. When all links from the page have been analyzed, so that it is necessary to choose a link from a new page to be analyzed, such algorithms choose a link from a page that is part of the same Web site as the given page and, of all pages that are part of the same Web site as the given page and contain links which have not yet been analyzed, may be reached from the given page in the fewest number of sequential links.

Alternatively, also among the algorithms which may be used are those which proceed in a "vertical" manner, always "drilling down" if possible to choose a next link to be analyzed. Such an algorithm may proceed in the manner set forth in the flow chart in FIG. 4, which illustrates a preferred embodiment. The process in FIG. 4 may occur after a specialized program has located a page which may be of interest, and it is desired to find other pages which are part of a same site as the page.

Figure 4:
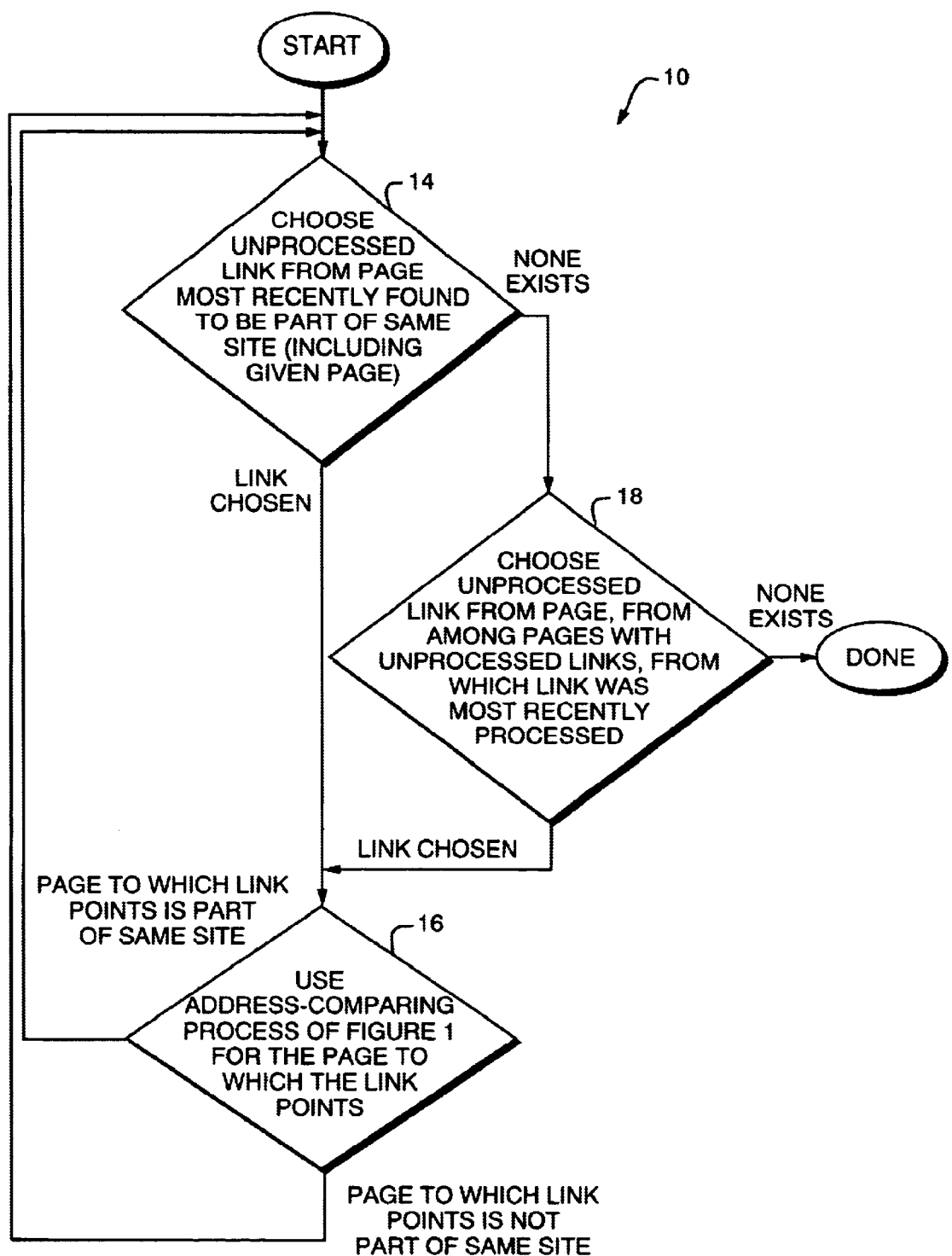
FIG. 4 is a flow chart illustrating the overall process, according to the present invention, which is carried out to find other pages which are part of a same Web site as an initial given page.

A site mapping process 10 begins, according to FIG. 4, when, as stated above, a specialized program has found a Web page of potential interest. (Hereinafter, the page of potential interest shall be referred to as the "given page.") A first step 14 in the site mapping process 10 consists of choosing an unprocessed link from a page most recently found to be part of a same site as the given page (including the given page itself).

If such an unprocessed link exists, a next step 16 in the process 10 is to utilize the address-comparing process 30, as previously described, to process the link.

The application of the present invention at this stage of the site mapping process 10 is illustrated by the flow chart of the address-comparing process 30 in FIG. 2, as described above. At the step 16 of the process 10, the process 30 of FIG. 2 is utilized to determine if the given page and the page to which the link being processed points are part of the same site.

The process 10 then continues by returning to the step 14. However, the page from which a next unprocessed link is chosen for processing at the step 14 will be different, depending on the results of the prior step 16. If at the prior step 16 the address-comparing process 30 of FIG. 2 concluded that the Web page to which the chosen link points is part of the same site as the given page, the step 14 now will attempt to process a link from the page newly-determined to be part of the same Web site. However, if at the previous step 16 the address-comparing process 30 of FIG. 2 concluded that the Web page to which the chosen link points is not part of the same Web site as the given page, the step 14 now will attempt to process a further link from the page from which the prior link was chosen.

If at the step 14 no unprocessed link from the page most recently found to be part of the same Web site as the given page is found to exist, the process 10 then proceeds to a step 18. At the step 18 an unprocessed link is chosen from a page, from among those pages with unprocessed links, from which a link was most recently processed.

If such a link exists, the process 10 proceeds to the step 16, at which the address-comparing process 30 is applied to the page to which the chosen link points, and the process 10 returns to step 14.

If at the step 18 no unprocessed link remains from any page found to be part of the same Web site as the given page, the process 10 is concluded.

Figure 5:
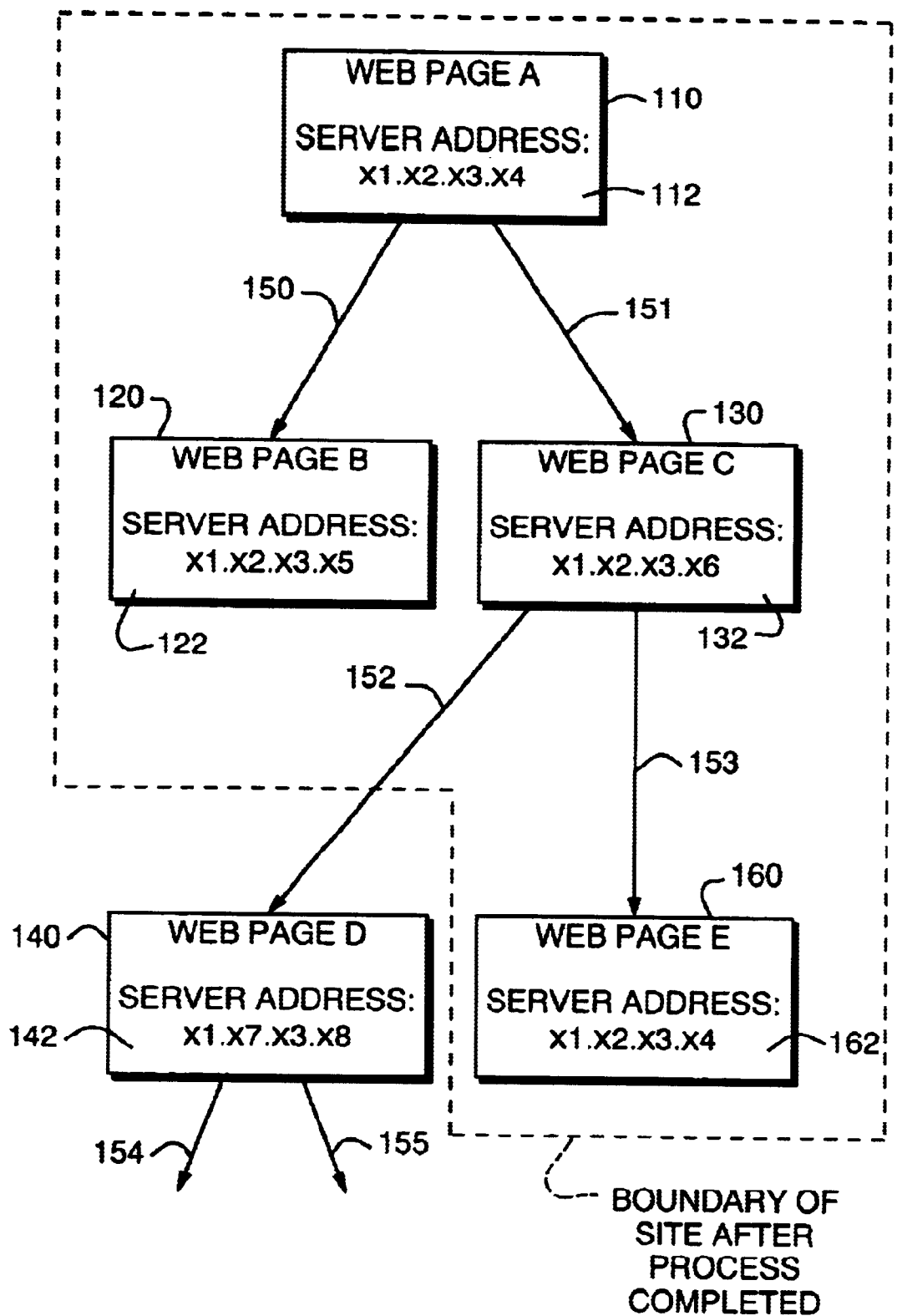
FIG. 5 is an example of a set of linked Web pages which can be analyzed according to the present invention to determine which, if any, of them are part of a same site.

The working of the process 10 of FIG. 4 may be illustrated on an actual assemblage of Web pages by reference to FIG. 5 in conjunction with the following Table 2, again in the situation where each page resides on only a single server:

The process 10 begins after a specialized program, such as a conventional Web crawler, finds a Web page A 110 which is to be analyzed to locate other pages in a site of which the page 110 is apart.

The process 10 begins at a step 14 to choose an unprocessed link from a page most recently found to be part of a same site as the given page 110. The page chosen at the step 14 may be the given page 110. In this example, the only page yet known to be part of the same site as the given page is the given page itself, and hence at the step 14 a link 150 from the given page 110 is chosen. (It will be appreciated that a link 151 from the given page 110 could have been chosen.)

TABLE 2

Steps in Analyzing Web Pages in FIG. 5 According to Processes of FIGS. 2 and 4

| | | |
|---|---|---|
| A | | Step 14: Choose Unprocessed Link From Page A 110 |
| | | Such a Link is Chosen From Page A 110: Link 150 |
| B | | Step 16: Use Address-Comparing Process 30 Of FIG. 2: |
| | | Determine If Page B 120 To Which Link 150 Points Is Part of Same Site As Given Web Page A 110 |
| | 1 | Step 31: Choose Server on Which First Page Resides and Server on Which Second Page Resides |
| | 2 | Step 32: Determine Address 112 of Server Upon Which Page A 110 Resides |
| | 3 | Step 33: Determine Address 122 of Server Upon Which Page B 120 Resides |
| | 4 | Step 36: Compare First 3 Bytes Of Addresses Only |
| | | First 3 Bytes of Address 122 are the Same as Those For Address 112 |
| | 5 | Conclude Page 120 is Part of Same Site as Page 110 |
| | 6 | Leave Process of FIG. 2 |
| C | | Step 14: Choose Unprocessed Link From Page B 120 |
| | | No Such Link Exists |
| D | | Step 18: Choose Unprocessed Link From Page, From Among Pages With Unprocessed Links, From Which Link Was Most Recently Processed |
| | | Such a Link is Chosen From Page A 110: Link 151 |
| E | | Step 16: Use Address-Comparing Process 30 Of FIG. 2: |
| | | Determine If Page C 130 To Which Link 151 Points Is Part of Same Site As Given Web Page A 110 |
| | 1 | Step 31: Choose Server on Which First Page Resides and Server on Which Second Page Resides |
| | 2 | Step 32: Determine Address 112 of Server Upon Which Page A 110 Resides |
| | 3 | Step 33: Determine Address 132 of Server Upon Which Page C 130 Resides |
| | 4 | Step 36: Compare First 3 Bytes Of Addresses Only |
| | | First 3 Bytes of Address 132 are the Same as Those For Address 112 |
| | 5 | Conclude Page 130 is Part of Same Site as Page 110 |
| | 6 | Leave Process of FIG. 2 |
| F | | Step 14: Choose Unprocessed Link From Page C 130 |
| | | Such a Link is Chosen From Page C 130: Link 152 |
| G | | Step 16: Use Address-Comparing Process 30 Of FIG. 2: |
| | | Determine If Page D 140 To Which Link 152 Points Is Part of Same Site As Given Web Page A 110 |
| | 1 | Step 31: Choose Server on Which First Page Resides and Server on Which Second Page Resides |
| | 2 | Step 32: Determine Address 112 of Server Upon Which Page A 110 Resides |
| | 3 | Step 33: Determine Address 142 of Server Upon Which Page D 140 Resides |
| | 4 | Step 36: Compare First 3 Bytes Of Addresses Only |
| | | First 3 Bytes of Address 142 are Different Than Those For Address 112 |
| | 5 | Step 38: Determine That There Are No Other Combinations of Servers Not Yet Analyzed |
| | 6 | Conclude Page 140 is Not Part of Same Site as Page 110 |
| | 7 | Leave Process of FIG. 2 |
| H | | Step 14: Choose Unprocessed Link From Page C 130 |
| | | Such a Link is Chosen From Page C 130: Link 153 |
| I | | Step 16: Use Address-Comparing Process 30 Of FIG. 2: |
| | | Determine If Page E 160 To Which Link 153 Points Is Part of Same Site As Given Web Page A 110 |
| | 1 | Step 31: Choose Server on Which First Page Resides and Server on Which Second Page Resides |
| | 2 | Step 32: Determine Address 112 of Server Upon Which Page A 110 Resides |
| | 3 | Step 33: Determine Address 162 of Server Upon Which Page E 160 Resides |
| | 4 | Step 36: Compare First 3 Bytes Of Addresses Only |
| | | First 3 Bytes of Address 162 are the Same as Those For Address 112 |
| | 5 | Conclude Page 160 is Part of Same Site as Page 110 |
| | 6 | Leave Process of FIG. 2 |
| J | | Step 14: Choose Unprocessed Link From Page E 160 |
| | | No Such Link Exists |
| K | | Step 18: Choose Unprocessed Link From Page, From Among Pages With Unprocessed Links, From Which Link Was Most Recently Processed |
| | | No Such Link Exists |
| L | | Process is Concluded |

The process 10 then continues at a step 16 to invoke the process 30 of FIG. 2 to process a Web page B 120 to which the link 150 points.

In the example provided herein, the process 30 analyzes the page 120, by proceeding through the steps 31, 32, 33, 36: to choose a server upon which the given page 110 resides, to choose a server upon which the page 120 resides, to find an IP address 112 of the server containing the page 110, which is x1.x2.x3.x4, to find an IP address 122 of the server containing the page 120, which is x1.x2.x3.x5., and to find that the page 120 is part of the same site as the page 110, because the server addresses 112, 122 are found to share the same first three bytes, x1, x2and x3. The process 30 then concludes. (It will be recognized by one of ordinary skill in the art that where, as in the example being illustrated here, each Web page resides on only a single server, the step 31 of the process 30 has no effect, since there is no choice to be made, and the steps 32 and/or 33 may be omitted if the IP addresses of the servers are already known.)

The site mapping process 10 then continues at the step 14 to choose an unprocessed link from a page most recently found to be part of a same site as the given page 110. In this instance, the page from which the link is to be chosen is the page 120 which has just been found to be part of the same site as the given page 110, but the page 120 has no links to other pages, and hence control passes from the step 14 to the step 18.

At the step 18, an unprocessed link is chosen from a page, among all pages with unprocessed links that are part of the same site as the given page, from which a link was most recently processed. In this instance, the page with unprocessed links, from which a link was most recently processed, is page 110, which has an unprocessed link 151. Link 151 is therefore chosen.

Accordingly, control passes to the step 16. The process 30 of FIG. 2 then is carried out for the link 151, which points to a Web Page C 130. Proceeding through the steps 31, 32, 33, 36, the process 30 finds that the page 130 is part of the same site as the page 110, to which the page 130 is linked by the link 151, because the addresses 112, 132 of the servers containing the pages 110, 130 share the same first three bytes x1, x2and x3. The process 30 then concludes and the process 10 of FIG. 3 again resumes.

In the process 10 control is then passed to the step 14 to choose an unprocessed link from a page most recently found to be part of the same site as the given page 110. In this example, the page most recently found to be part of the same site as the given page 110, is the page 130, and hence at the step 14 a link 152 from the page 130 is chosen. (It will be appreciated that a link 153 from the page 130 could have been chosen.)

The process 10 then continues at the step 16 to invoke the process 30 of FIG. 2 with respect to the page 140 to which the link 152 points. The process 30 then proceeds through steps 31, 32, 33, 36, wherein the process 30 concludes that the server upon which the Web page 140 resides does not share the same first three bytes as the server on which the given Web page 110 resides. Control then passes to the step 38 where it is determined that there are no other combinations of servers to be analyzed. It is therefore concluded at the step 38 that although the page 130 is part of the same site as the page 110, the page 140 is not, although the page 140 is linked to the page 130, because the first three bytes in the IP address 142 of the server containing the page 140 are not the same as the first three byes of the address 132 of the server containing the page 130; a second byte of the address 142 is x7, not x2. (It will be apparent to one of ordinary skill in the art that the process 30 at the step 36 would achieve the same ultimate result whether it compared the address 142 of the server containing the page 140 to the address 132 of the server containing the page 130, to which the page 140 is linked, or to the address 112 of the server containing the page 110, the initial page found for the site.) The process 30 then concludes, and the process 10 resumes.

In the process 10 control is then passed to the step 14, to choose an unprocessed link from a page most recently found to be part of the same site as the given page 110. In this example, the page most recently found to be part of the same site as the given page 110, remains the page 130, and hence at the step 14 a link 153 from the page 130 is chosen.

The process 10 then continues at the step 16 to invoke the process 30 of FIG. 2 to analyze a page 160, to which the page 130 is linked by the link 153. The process 30 then follows the steps 31, 32, 33, 36 to find that the page 160 is part of the site being mapped, because the address 162 of the server containing the page 160 has the same first three bytes as the address 112 of the server containing the page 110. The process 30 then concludes, and the process 10 resumes.

In the process 10 control is then passed to the step 14, to choose an unprocessed link from a page most recently found to be part of the same site as the given page 110. In this example, the page most recently found to be part of the same site as the given page 110, is the page 160. In this instance, the page 160 has no links to other pages, and hence control passes from the step 14 to the step 18.

At the step 18, an unprocessed link is chosen from a page, among all pages with unprocessed links that are part of the same site as the given page, from which a link was most recently processed. In this instance, however, no pages remain with unprocessed links which are part of the same Web site as the given page 110, and hence the process 10 is completed.

The example above has illustrated one particular use of the process 10, in the case of a particular configuration of Web pages. Its application to other configurations of pages will now be apparent to one of ordinary skill in the art.

It will be evident that the process may be utilized in algorithms or applications that do not attempt to map an entire site, or to find as many pages as possible that are part of a same site as a given page, but merely proceed until they determine a particular fact of interest about a site, such as that it contains certain data or features, or about a page, such as that it is part of a site which contains certain data or features.

For example, if the user has identified a Web page that by itself lacks a particular desired characteristic, but the user desires to determine if the page is part of a Web site that contains the desired characteristic, the user may initiate the process 10 of FIG. 4 beginning with the Web page identified. Whenever the process 10 determines that another Web page is part of the same site as the initial Web page identified, the user then may analyze the other Web page alone to determine if the other Web page has the desired characteristic, and/or the user may analyze a set of pages, including the page initially identified, the other page, and any further pages determined to be part of the given Web site, to determine if the set of pages has the desired characteristic. The user then may stop the process 10 whenever he determines that the other Web page, which is part of the same site as the initial Web page, or the set of pages which is part of the same Web site as the initial page, has the given characteristic.

One circumstance in which this is of interest is in determining if a Web page is part of a site of interest for electronic commerce purposes. Other circumstances where this may be useful will be apparent to one of ordinary skill in the art.

Another aspect of the system described herein addresses a problem that often initial search queries do not return an optimum set of Web pages or sites, because the user has not been able to define a query that produces a sufficient number of useful pages or sites while avoiding producing large numbers of pages or sites that are not useful. This aspect of the system utilizes an iterative technique, to permit the search query to be modified based upon the user reviewing a limited number of Web pages or sites initially identified as potentially useful by the algorithm. The iterative process of review and search query improvement may be repeated until such time as the user is satisfied with the set of Web pages or sites being provided.

There are many information retrieval (IR) algorithms that attempt to collect material (documents, Web pages or sites are common subjects) of interest to a user. These algorithms, no matter how sophisticated, may share a common weakness: because they are not iterative, they can only be truly effective if the user can define characteristics that will identify the material he is seeking with some precision, both efficiently excluding unwanted material and including material of interest. But users may not be able to do so. They may have only a vague idea of what they want, or they may know precisely what they want, but not know how to identify document, page or site characteristics likely to be associated with such material. Thus, even the most subtle and sophisticated search algorithms may only be of limited utility, and users may end up frustrated and lacking the material they were seeking.

Prior efforts have been made to make the information retrieval process iterative in order to address this problem. However, these prior efforts have required the user to invest substantial amounts of effort in reviewing quantities of material to provide the feedback required to improve the search algorithm, and thus have been of limited utility. For example, D. B. Aronow, S. Soderland, J. M. Ponte, Feng F., W. B. Croft and W. G. Lehnert, *Automated Classification of Encounter Notes in a Computer Based Medical Record*, reports on a process whereby an effective algorithm for identifying documents concerning a particular medical situation was developed, using a process by which an initial search algorithm was specified, and users graded certain of the documents for relevance in order to "train" the algorithm. However, a very large number of documents had to be reviewed in order for the process to work.

Another aspect of the present invention avoids this problem by using successive iteration. The invention may be utilized in order to search the Web to retrieve Web pages or sites of interest to a user. Alternatively, it may be used to search any other collection of computer-based documents or data sufficiently extensive that an automated search technique can be helpful. Other examples will be apparent to one of ordinary skill in the art.

The invention may be utilized in connection with retrieval of material from the Web either in the context of an unrestricted search for material, or in the context of a search for material of a specific type, such as but not limited to electronic commerce sites.

Figure 6:
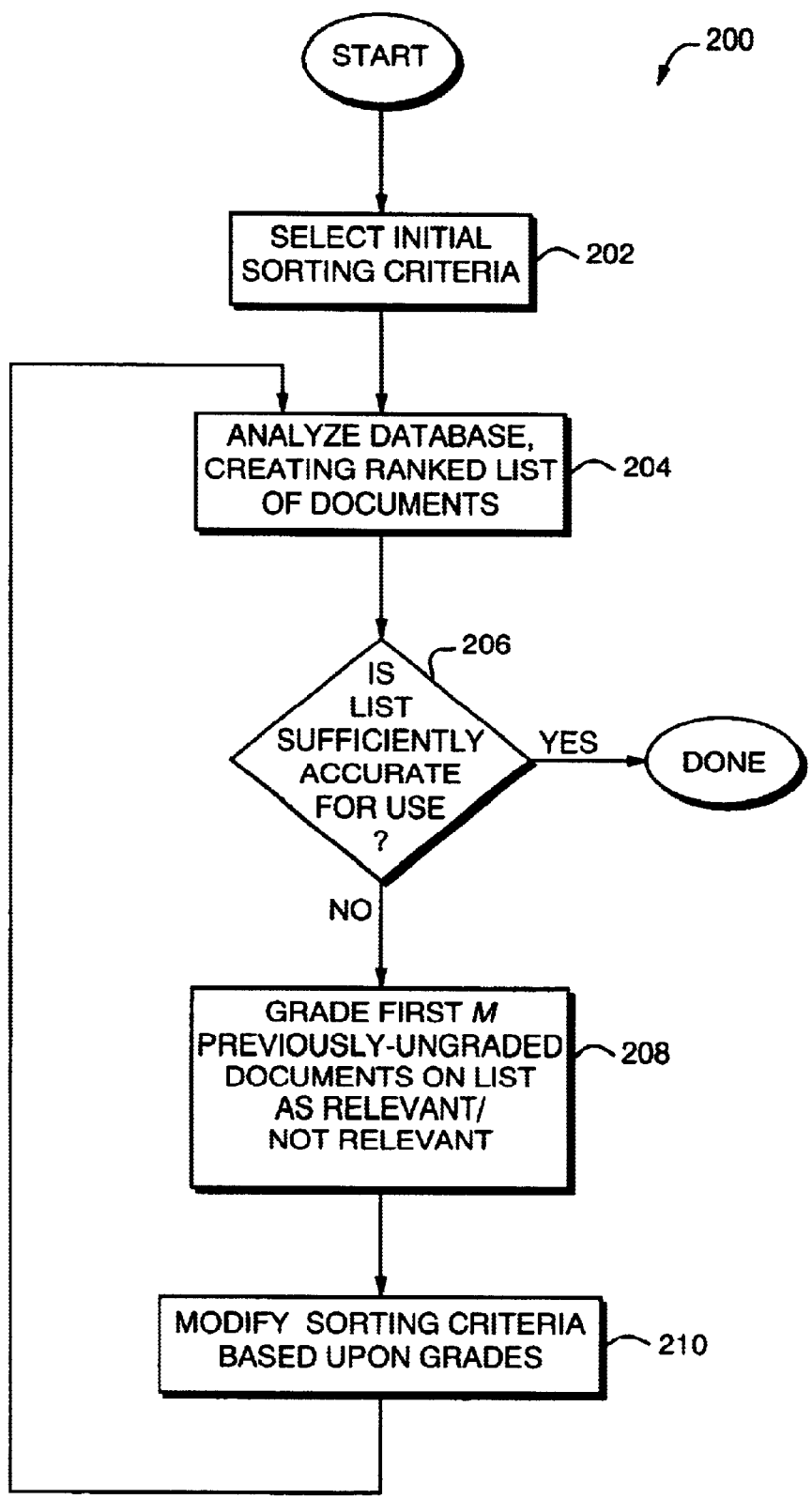
FIG. 6 is a flow chart which illustrates the process according to the present invention whereby an initial search query is improved based upon feedback from a user.

Referring now to FIG. 6, a process 200 by which the invention is carried out in the case of a Web search for pages of interest that are related to electronic commerce may be illustrated. A first step 202 consists of the selection of initial sorting criteria or a search query.

In the example given here, this is done by means of a user specifying criteria which it is believed the pages of interest may share. One or more terms that are desired to be present may be identified. (A term may be a word, a number, an acronym, an abbreviation, a sequential collection of the above, or any other collection of numerals, letters and/or symbols in a fixed order which may be found in the pages in the collection to be searched.)

Other implementations of the present invention may allow the user to request that certain terms he specifies be absent, or that they be present and have certain specified locations with respect to each other in the site (for example, that a given term be located within a given distance from another given term, or within the same section of the site). Similarly, other implementations of the present invention may allow the user absolutely to require that a given term be present or absent, instead of simply specifying that it be desired.

Alternatively, the process may utilize an automated process to generate an initial set of selection criteria. The criteria may be arbitrary, or they may be chosen based upon the identity of the user.

However the initial selection criteria are chosen, a next step 204 in the process 200 consists of an information retrieval algorithm identifying and ranking, in order of predicted utility or relevance, electronic commerce pages that satisfy the initial criteria to a greater or lesser degree. This initial list will be presented to the user. Any one of a number of available information retrieval algorithms, known to those of ordinary skill in the art, may be used for this purpose.

A next step 206 consists of the user then reviewing the list, to determine if the list is sufficiently accurate and complete for his use, in which case he will be done. Assuming, however, that he is not satisfied with the list of pages as first returned to him, a next step 208 consists of his manually reviewing a limited number of pages on the list presented to him, most preferably but not necessarily those at or near the top of the list, and identifying them as relevant or not. (It may be useful to review approximately ten entries on the list, more or less, but the precise number is not critical to the result.)

After the pages have been reviewed, a next step 210 is for the search algorithm to modify the search criteria, adding new terms, replacing the prior terms and/or changing the weight of terms, based upon the characteristics of the pages found to be relevant and/or not relevant.

In the preferred embodiment, each term found in the relevant pages is assigned a score based upon the frequency of its occurrence in the relevant pages, compared to the frequency of its occurrence on average in pages in the collection as a whole. (To the extent that these terms also are found in the pages determined to be not relevant, the score achieved by the pages is reduced based upon the frequency of its occurrence in the irrelevant pages, compared to the frequency of its occurrence on average in pages in the collection as a whole.) In the preferred embodiment, the formula used in ranking terms is:

$W_T = \log(P_T(R)/P_T(\bar{R}))$, where $W_T$=the weight assigned to a term T, $P_T(R)$=the probability that the term T occurs in a page determined to be relevant, $= N_{TR}/(\Sigma_R N_{tR})$, where $N_{TR}$=the number of occurrences of the term T in pages determined to be relevant $\Sigma_R N_{tR}$=the total number of occurrences of terms in pages determined to be relevant $P_t(R)$=the probability that the term T occurs in a page determined to be irrelevant, $$=N_{TR}/(\Sigma_{pullout;zu944200.900}N_{tpullout;zu944200.901}),$$ where $N_{TR}$=the number of occurrences of the term T in pages determined to be irrelevant $\Sigma\text{R}N_t\text{R}$=the total number of occurrences of terms in pages determined to be irrelevant This particular formula is by no means the only formula that may be used; others will be apparent to one of ordinary skill in the art.

The terms which achieve the highest scores by this process are then utilized as the terms in the new search query. In the preferred embodiment, only terms which achieved a positive score $W_T$ are considered, and of those only terms whose scores $W_T$ under the above formula exceed the mean value of $W_T$ by two standard deviations are used. The terms to be utilized in the subsequent search query then are weighted according to the following formula, which is Robertson's term frequency score:

$$S_D = \Sigma W_T * TF_{TD} * IDF_T,$$

where: $S_D$ is the total score for a document D, $W_T$ has the value set forth above, $TF_{TD}$=Robertson's term frequency for Term T in Document D $$=N_{TD}/(N_{TD}+K_1+K_2*(L_D/L_0)),$$

where: $N_{TD}$ is the number of times the term T occurs in document D, $L_D$ is the length of document D, $L_0$ is the average length of a document in the collection of documents indexed, and $K_1$ and $K_2$ are constants. ($K_1$ typically may be assigned a value of 0.5, and $K_2$ 1.5, but these values may be varied without departing from the spirit and scope of the invention.) and $IDF_T=\log((N+K_3)/N_T)/\log(N+K_4)$ where:

N is the number of documents in the collection, $N_T$ is the number of documents containing the term T in the collection, $K_3$ and $K_4$ are constants. ($K_3$ typically may be assigned a value of 0.5, and $K_4$ 1.0, but these values may be varied without departing from the spirit and scope of the invention.)

Documents are then ranked in order of their scores $S_D$.

In operation, approximately one hundred terms are added to the search query with each iteration, but the exact number is not critical, and may be varied without departing from the scope or spirit of the invention.

A further aspect of this invention utilizes the above technique for the purpose of developing criteria to be utilized in determining if a document which is part of a database has certain desired characteristics or not. This aspect of the invention is useful because there are many purposes for which it is useful to be able to classify documents automatically.

This aspect of the invention begins by generating an initial list of sites that may have the desired characteristics. This may be done by enumerating sites known to have the characteristics, or by choosing a search query thought to be suitable for the purpose, and using that query to generate a list of sites, or by any other method.

Whichever method is used to generate the initial list of sites, the process 200 of the invention as illustrated in FIG. 6 is then implemented, beginning at the step 208 by grading a limited number of the sites on the generated list as relevant or not relevant (i.e., as having the desired characteristics or not). At the step 210 the process continues by generating a search query based upon the terms found in the relevant and irrelevant documents, using the formulae and methods described previously. The iterative process 200 is then continued. However, at the step 204, instead of applying the new search query to the entire database (i.e., the Web), it is applied only to the initial list of sites generated. The process continues with successive iterations until at the step 206 in an iteration the user determines that the search query is sufficiently accurately ranking the sites on the initial list of sites. The process 200 then is terminated. The user then reviews the ranked list of documents created in the prior step 204, and chooses a suitable fixed cutoff score, to conclude that all sites with scores above the cutoff have the desired characteristics, while all sites below the cutoff score are considered not to have the characteristics. This cutoff score can then be applied to any site newly-encountered on the Web, to determine if it has the desired characteristics.

As will be apparent to one of ordinary skill in the art, by varying the cutoff score one may alter the characteristics of the list of sites chosen. In particular, by raising the cutoff score, one may increase the precision of the selection process (that is, reduce the probability that a site selected does not have the characteristics), but also reduce the recall of the selection process (that is, reduce the probability that a site with the characteristics is selected). Conversely, by lowering the cutoff score one may reduce the chance of omitting a relevant site, but increase the chance of including an extraneous site.

This aspect of the invention may be applied in particular to finding a set of criteria for determining whether a site is an electronic commerce site or not. In this preferred embodiment, an initial group of several hundred thousand sites are generated as the set of sites upon which the process is to be carried out, in each iteration of the process a limited number of the sites are reviewed, and identified as electronic commerce sites or not, the search query is modified as described above based upon the occurrence of terms in the documents judged to be electronic commerce sites, as opposed to non-electronic commerce sites, and ultimately a cutoff score is chosen, which then can be applied to any site encountered on the Web, to classify the site as an electronic commerce site or not.

The remaining aspects of the invention all respond to problems which arise out of the fact that many common schema for the retrieval of Web documents (including but not limited to Web pages or sites) of interest rely upon the use of inverted term lists to maintain information about the use of various terms in the documents, but do not maintain information about the documents themselves, other than through the inverted term lists.

Figure 7:
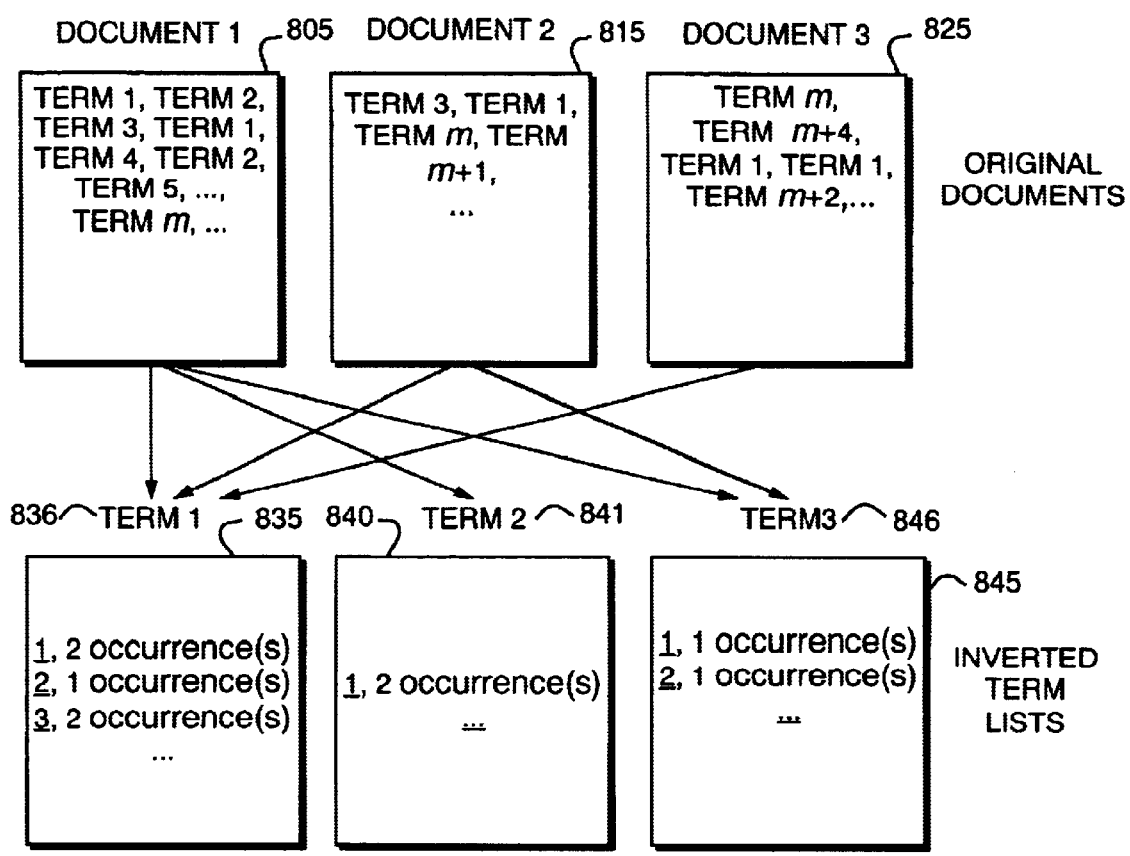
FIG. 7 illustrates a conventional (prior art) relationship between documents and inverted term lists.

In order to understand these aspects of the invention, it is appropriate first to describe the structure of a conventional inverted term list, and its relationship to the underlying collection of documents about which it contains information. FIG. 7 illustrates one possible conventional relationship between underlying documents in a document collection, such as, but not limited to, the Web or a portion thereof, and associated inverted term lists which may be used to facilitate the retrieval of desired documents from the collection. As before, either Web sites or Web pages may be treated as documents.

In constructing inverted term lists, it is necessary to decide what terms should be included. It may be determined to store information with respect to all terms which occur in documents in a collection, or it may be determined to exclude common words such as "the" and "and," or it may be decided to store information only about certain specified terms, such as those which may occur in a particular field such as a scientific or technical discipline. (A term may be a word, a number, an acronym, an abbreviation, a sequential collection of the above, or any other collection of numerals, letters and/or symbols in a fixed order which may be found in the documents in the collection to be searched.) In general, terms that are considered to be useful for purposes of retrieving documents may be selected. (Hereinafter, the terms about which it has been determined to store information are referred to as the "terms of interest.")

An inverted term list may be created for each term of interest that is found to occur in any of the documents in the collection. In the example illustrated in FIG. 7, inverted term lists 835, 840, 845 identify, by means of providing a unique document identifier number, every document from the collection in which corresponding terms 836, 841, 846 occur, and state how many times each of the terms 836, 841, 846 occurs in the document. Thus, in FIG. 7 the inverted term list 835 corresponding to the term 836 states how often the term 836 occurs in each of the documents 805, 815, 825 in the collection. In this example, the inverted term list 835 for the term 836 contains an entry for the unique document identifier number of the first document, "1", and states that the term 836 occurs twice in Document 1 805, then an entry for the unique document identifier number, "2", of the second document, and a statement that the term 836 occurs once in Document 2 815, then an entry for the unique document identifier number, "3", of the third document, and a statement that the term 836 occurs twice in Document 3 825, and so on. It will be appreciated by one of ordinary skill in the art that inverted term lists may also contain other information as well, as will be discussed below.

Inverted term lists may be stored as linked lists, or they may be fixed arrays.

Lookup tables may be created in connection with inverted term lists. One lookup table which may be created may provide the locations in the document collection of the documents whose contents have been indexed in the inverted term lists; in the case of Web pages or sites, the URLs of the pages or sites may be provided. An example of such a lookup table is shown in the upper portion of FIG. 8. The document URLs may be stored in the lookup table in the order of the unique document identifier numbers of the documents. Then, if the inverted term lists contain the document identifier numbers of the documents which contain the term in question, and the lookup table is maintained as a fixed array, the location in the lookup table array of an actual document URL may be determined directly from the document identifier number.

If such a lookup table is not created, inverted term lists may contain the locations in the document collection, such as the URLs, of the documents which contain the term in question.

Another lookup table which may be created may provide information about the terms for use when searches for relevant documents are done using the inverted term lists. An example of such a lookup table is shown in the lower portion of FIG. 8. For each term, this lookup table may contain the English (or other natural language) term itself, the address of the inverted term list for the term, and other information which may be of use in using the inverted term lists to rank documents for relevance, such as, but not limited to, the number of documents in the collection in which the term occurs, the number of times the term occurs in documents in the collection, and the maximum term frequency score for the term in any one document in the collection.

The term frequency scores for the term may be calculated based on any one of a number of formulae which will be familiar to one of ordinary skill in the art, such as but not limited to Robertson's term frequency formula:

$$TF_{TD}=N_{TD}/(N_{TD}+K_1+K_2*(L_D/L_0)),$$

where: $N_{TD}$ is the number of times the term T occurs in document D, $L_D$ is the length of document D, $L_0$ is the average length of a document in the collection of documents indexed, and $K_1$ and $K_2$ are constants. ($K_1$ typically may be assigned a value of 0.5, and $K_2$ 1.5, but these values may be varied without departing from the spirit and scope of the invention.)

The terms may be stored in this lookup table in any order, such as alphabetical order. For ease of reference they may be stored in the numerical order of unique term identification numbers assigned to each term. If this is done, and the lookup table is maintained as a fixed array, the location of information about a term in the lookup table may be determined directly from the term identification number of the term.

The inverted term lists also may contain the number of documents in the collection in which the term occurs, the number of times the term occurs in documents in the collection, and/or the maximum term frequency score for the term in any one document in the collection, if this information is not maintained in the lookup table which contains the address of the inverted term list for the term. The inverted term list for a term also may contain, not simply the number of times the term occurs in a particular document, but the location in the document at which the term occurs.

A single inverted term list may be maintained for each term of interest. Alternatively, in order to permit more expeditious responses to search queries, two inverted term lists may be maintained for each term of interest. The first, or "top" inverted term list, may contain information about an arbitrary number of documents, such as 1000, which have the highest term frequency scores for the term. The second, or "remainder" inverted term list, may contain information about the occurrence of the term in the remaining documents. (If separate top and remainder inverted term lists are maintained, then a lookup table which contains the maximum term frequency scores for terms may contain separate maximum term frequency scores for documents on the term's top inverted term list and for documents on the term's remainder inverted term list.)

In the inverted term lists, information about documents may be stored in order of the term frequency score for the documents, so that the documents with the highest term frequency scores are placed at the top of the inverted term list.

Figure 9:
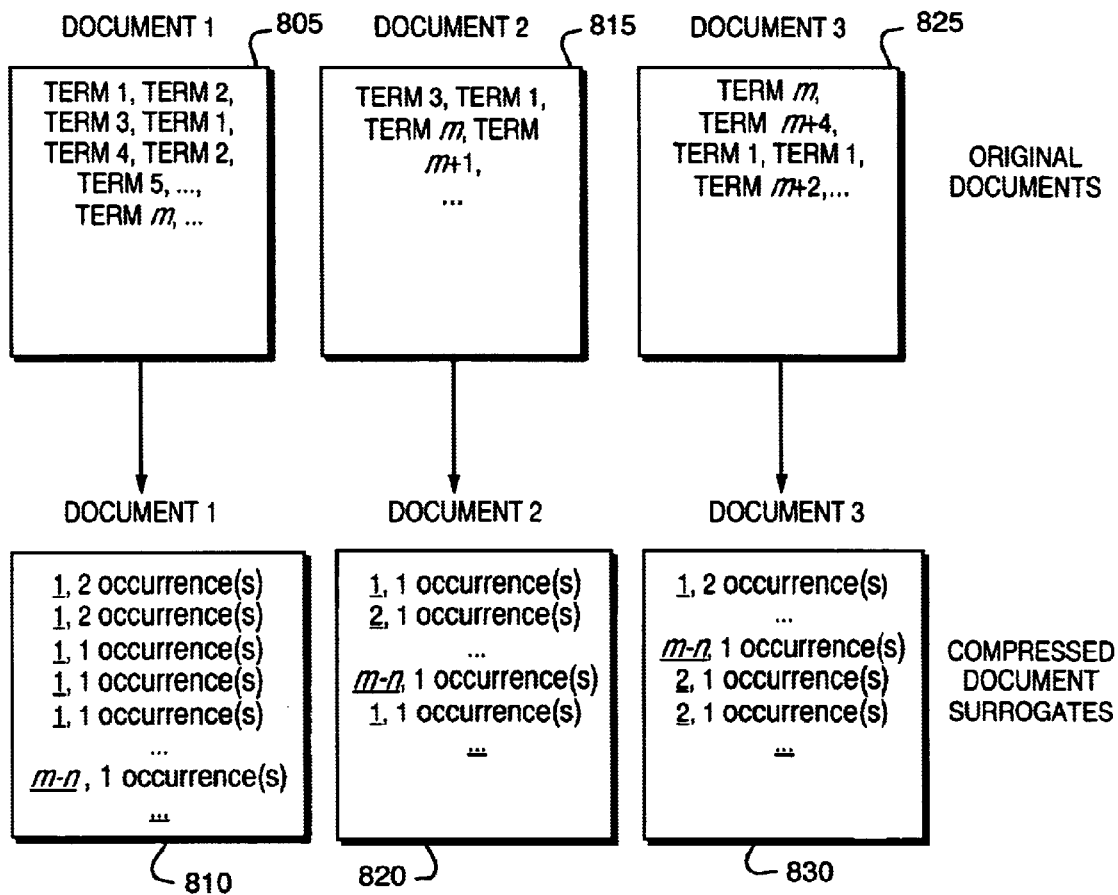
FIG. 9 illustrates a relationship between documents and compressed document surrogates according to the present invention.

Referring now to FIG. 9, a further aspect of the invention comprises a device known as a compressed document surrogate for storing information about a document that is part of a collection of documents of potential interest. This may be illustrated as applied to a case where the documents of interest are Web pages, but persons of ordinary skill in the art will recognize that the invention may equally be applied to collections of Web sites or of other varieties of computerized documents.

It may be determined to store information with respect to all terms which occur in documents in a collection, or it may be determined to exclude common words such as "the" and "and," or it may be decided to store information only about certain specified terms, such as those which may occur in a particular field such as a scientific or technical discipline. (A term may be a word, a number, an acronym, an abbreviation, a sequential collection of the above, or any other collection of numerals, letters and/or symbols in a fixed order which may be found in the documents in the collection to be searched.)

If the compressed document surrogates are to be used in conjunction with inverted term lists, the same set of terms which the inverted term lists cover may be used in the compressed document surrogates. (Hereinafter, the set of terms about which it has been determined to store information are referred to as the "terms of interest.")

If inverted term lists are not created for multiword terms, and the inverted term lists and compressed document surrogates do not maintain information about the location of terms in a document, but it is desired to be able to search for multiword terms, the compressed document surrogates may include multi-word terms which are omitted from inverted term lists. If this is done, a search for a multiword term may be performed by searching for each word in the term, and then consulting the compressed document surrogate of any document found to contain the individual words, to determine if the desired multiword term is in the document.

A compressed document surrogate for a particular document comprises a table of desired information about all of the terms of interest which occur in the document, in a suitable order. This desired information may include the number of times the term occurs in the document, and/or the term frequency score for the occurrence of that term in that document, according to Robertson's term frequency formula or any other formula, and/or the location in the document (in absolute terms or relative to the prior occurrence) of each occurrence. (Other relevant information may be added at the discretion of the user without departing from the spirit or scope of the invention.) Alternatively, a compressed document surrogate may simply indicate that a term occurs in the document, with no further information about specific occurrences or about the number of occurrences. A compressed document surrogate may provide the address of the inverted term list for each term of interest which occurs in the document, and/or the address of the location in the inverted term list of the entry for that document. Alternatively, a compressed document surrogate may provide the address of a location in a lookup table of a term of interest which occurs in the document, or information, such as a term identification number, from which the address of a location in a lookup table of the term may be determined.

In the preferred embodiment of a compressed document surrogate illustrated in FIG. 9, it is determined to store information about all terms which occur in documents, other than specified common words. In this embodiment, it is further decided to store information only about documents that are part of electronic commerce sites. In this embodiment, it is further decided that a compressed document surrogate for a document shall identify each term of interest found in the document, and specify how many times the term occurs in the document, but shall provide no further information about the occurrence of terms in the document.

In this embodiment, the term information in the document surrogates is stored in order of term identification number. Each term is assigned a unique integer identification number. (Term identification numbers are assigned to terms in the order in which the terms are first encountered in the course of constructing the table and associated inverted term lists, so that the first term found in the first document indexed is assigned the term identification number "1", and so on. Since terms are assigned unique term identification numbers, when a term already assigned a term identification number is encountered again, either in the same or in a subsequent document, no new term identification number is assigned to it.) Rather than storing the term identification numbers themselves, the differences from the previous term identification numbers are stored. For example, the following indicates that Term 1 appears 5 times, Term 10 appears 1 time, and so forth:

(1,5) (10,1) (30,2) (50,3) (100,4).

In the preferred embodiment, where the differences or offsets from the previous term identification numbers are stored, what is actually stored is:

(1,5) (9,1) (20,2) (20,3) (50,4).

By storing the differences instead of the term identification numbers, the numbers to be stored will be considerably smaller. This allows the surrogate to be compressed by using a variable length encoding of the integer values. The differences are encoded using Golomb coding. (Golomb, S. W. 1966. Run-length encodings. IEEE Transactions on Information Theory, vol. 12 no. 3 pp 339–401)

The term counts are encoded in unary, i.e. the number 1 is encoded as 0, 2 is encoded as 10, 3 as 110 etc. Someone of ordinary skill in the art will recognize that other variable length encodings may also be used to encode these values.

By compressing the differences and counts, the document surrogates can be stored in only 10% of the space required by the original text. Similarly, if one were to store the within document position in the surrogate, the difference from the previous position would be stored rather than the absolute position. (Thus, a term occurring in positions 1, 3, 5, and 10 in a document will have this information stored as 1, 2, 2, 5.) As before, the smaller average sizes allow the information to be encoded in fewer bits, thereby saving space.

Thus, in FIG. 9, a surrogate 810 lists a term identification number, "1", of a first term, Term 1, used in a document 805, and the number of occurrences (two) of Term 1 in the document 805. The surrogate 810 then lists the difference between the term identification number, "1" of the first term, and the term identification number "2" of a second term, Term 2, which occurs in the document 805, namely "1", and the number of occurrences (two) for Term 2 in the document 805, reflecting that that term is present in the document 805. The surrogate 810 then lists the difference between the term identification number, "2" of the second term, and the term identification number "3" of a third term, Term 3, which occurs in the document 805, namely "1", and the number of occurrences (one) for Term 3 in the document 805, reflecting that that term is present in the document 805. Note that the surrogate 810 only contains a single entry for Terms 1 and 2, even though the terms occur more than once in the underlying document 805. Similarly, a surrogate 820 for a second document 815 lists the term identification number, "1", of Term 1, and the number of occurrences (one) of Term 1 in the document 815, because Term 1 is present in the Document 815, but the surrogate 820 does not list Term 2, because Term 2 is not present. The surrogate 820 then lists the difference between the term identification number, "3", of Term 3, and the term identification number of Term 1, "1", namely "2", and the number of occurrences of Term 3, because Term 3 is present, and so on.

Terms may be stored in a surrogate in any suitable order, such as but not limited to alphabetical order. In the preferred embodiment described here, the terms are stored in order of term identification number. In the preferred embodiment, in order to conserve space, further information about terms is stored in a lookup table of the type illustrated in the lower portion of FIG. 8. The location in the lookup table of information concerning the term of interest may be determined from the term identification number, in that the term lookup table is a fixed array and terms are stored in the table in order of the term identification number. For each term, the term lookup table identifies the actual term and contains further information about the term, such as the location of an inverted term list for the term, the number of documents in the collection in which the term occurs, and the maximum term frequency scores for the term in any one document in the term's "top" inverted term list, and in any one document in the term's "remainder" inverted term list.

A further aspect of the invention which takes advantage of these compressed document surrogates is a method of updating inverted term lists in an efficient manner that reduces the computer processing resources required for the task.

Figure 10:
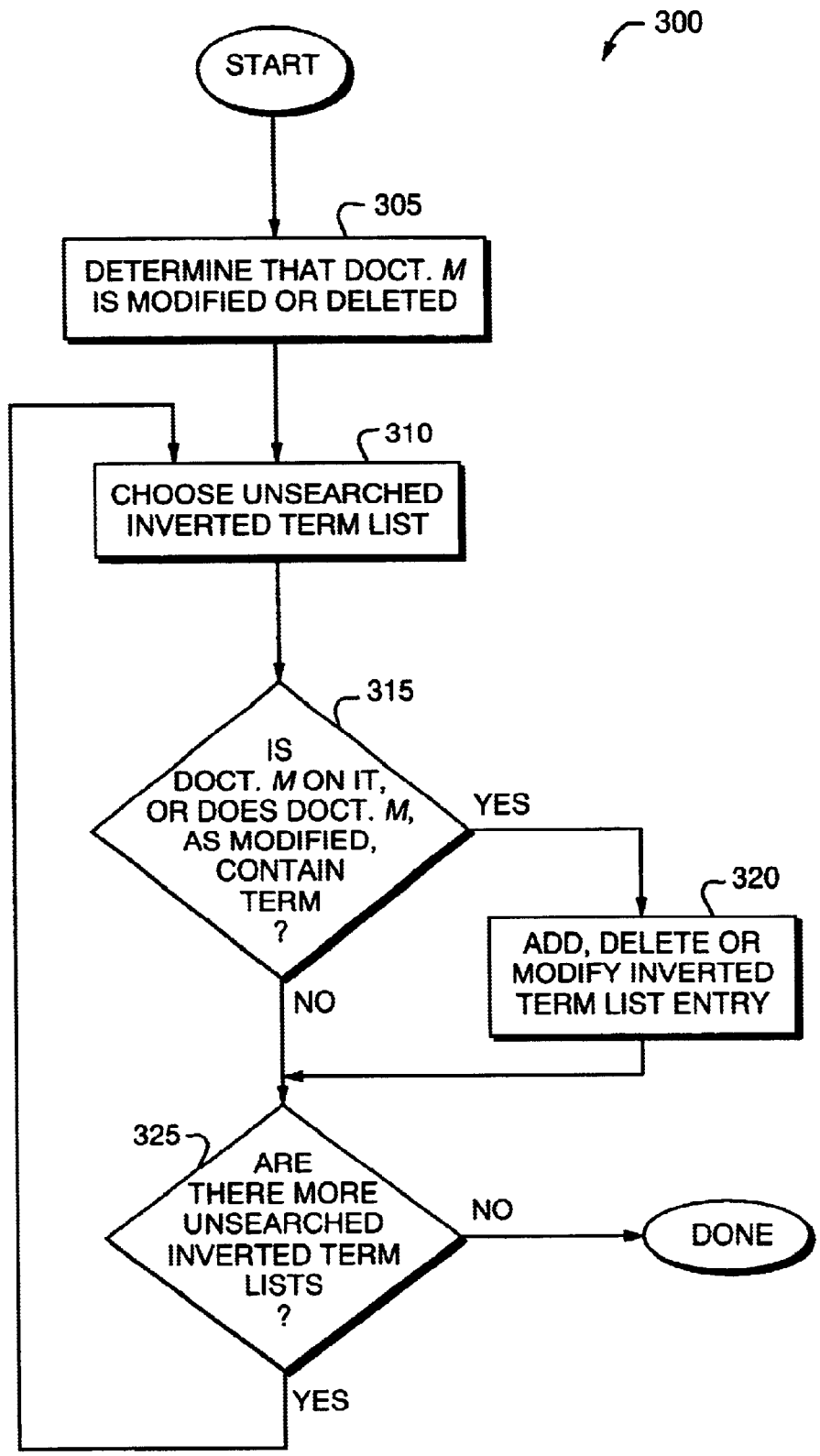
FIG. 10 is a flow chart which illustrates a conventional (prior art) process by which inverted term lists are updated to account for changes in an underlying document.
Figure 11:
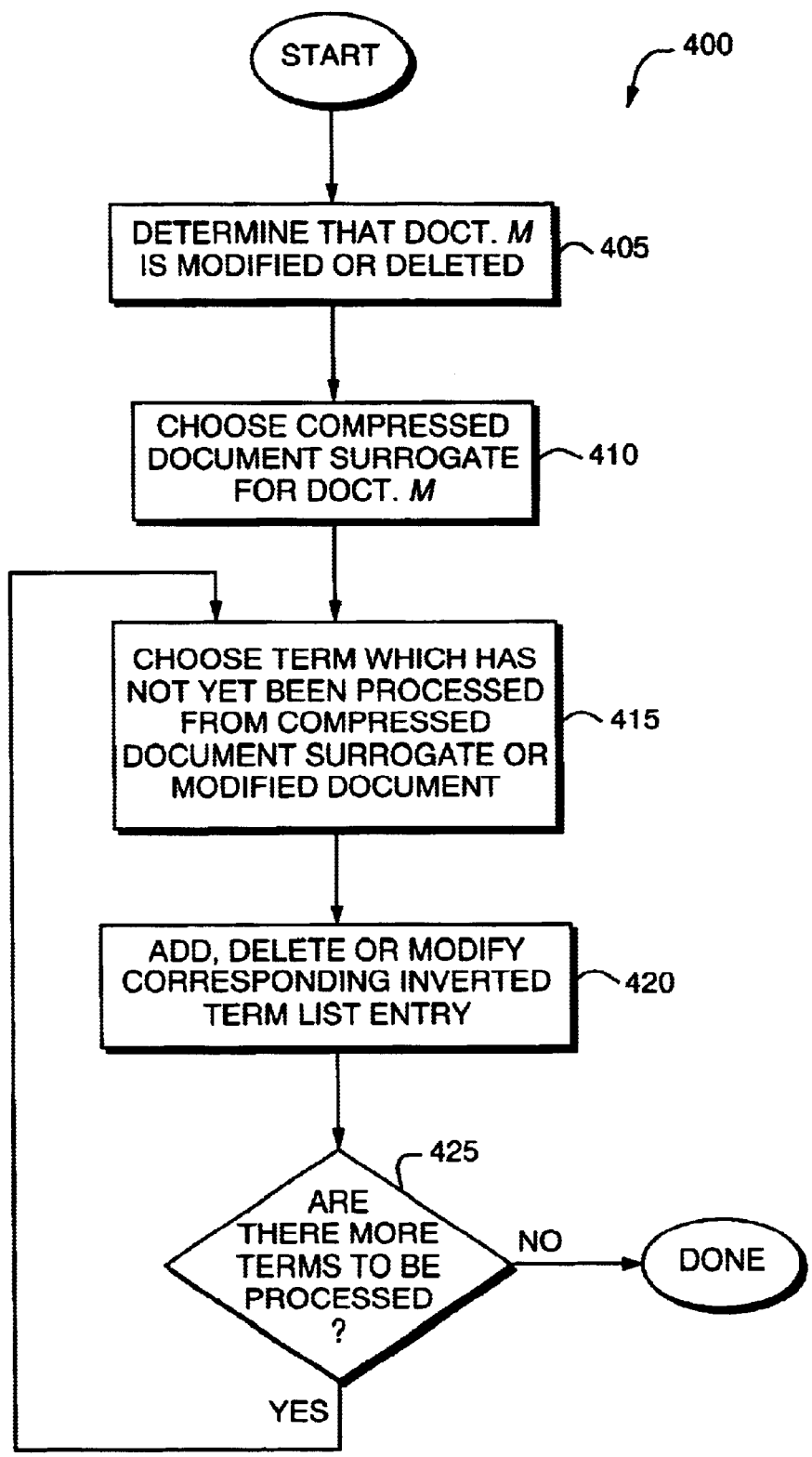
FIG. 11 is a flow chart which illustrates a process by which inverted term lists are updated to account for changes in an underlying document, using compressed document surrogates according to the present invention.

Consulting FIGS. 10 and 11, a process 400 of updating inverted term lists according to the present invention may be compared to a conventional process 300. For simplicity, the description given here assumes that only a single inverted term list is maintained for each term. As will be discussed below, if separate top and remainder inverted term lists are maintained, the two lists may be combined into a single list before processing, and then after processing is complete new top and remainder lists are created. (This is necessary because when a document is changed it may move from the top inverted term list to the remainder list, or from the remainder list to the top list.) Alternatively, the process may be carried out without first combining the lists. If this is done, it must be determined, whenever an inverted term list is modified to reflect a change in a document, whether the change has caused the document term frequency score to change such that the document will move from one inverted term list to the other. If its score has so changed, the document must be moved from the one list to the other, and another document must be moved in the opposite direction to compensate for the change.

In the conventional process 300 of FIG. 10, in a first step 305 it is determined that a Document M in an underlying collection, such as the Web, has been modified or deleted. Following the step 305 is an iterative process, executed for every inverted term list, to determine if Document M now contains, or previously contained, the term corresponding to the list. The iterative process begins at a step 310 by selecting a first unsearched inverted term list. The iterative process then continues, at a step 315, to determine if Document M is on the selected inverted term list, or if the modified Document M now contains the term. The process determines this by examining the inverted term list to determine if the inverted term list contains the document identifier number of Document M, or other indicator that Document M contains the term. If this inverted term list does contain Document M's identifier number, and/or if the modified Document M contains the term, the process proceeds to a step 320 to delete or appropriately modify the inverted term list, according to the modification made to Document M. The process then continues to a step 325. If, on the other hand, it is determined at the step 315 that Document M did not previously and does not now contain the term, the process skips the step 320 and goes directly to the step 325. In either event, at the step 325 the process determines whether any inverted term lists remain to be searched. If none remains, the process of updating the inverted term lists to reflect changes in Document M is complete. If any remain, the process returns to the step 310 and continues through another cycle to process the next inverted term list.

Thus, the conventional process 300 requires cycling through all of the inverted term lists in order to update the lists to reflect changes to a single document, even though that document may include only a few terms.

FIG. 11 demonstrates the process 400 according to the invention which uses compressed document surrogates. The process begins with a step 405 where it is determined that Document M has been modified or deleted. At a next step 410 in the process 400 the former compressed document surrogate for Document M, the document which has been modified or deleted, is chosen. A next step 415 in the process 400 then selects a term, either in the former surrogate for Document M or in Document M as modified, which has not yet been processed. A step 420 then appropriately modifies or deletes the information concerning Document M in the inverted term list for the term.

Figure 12:
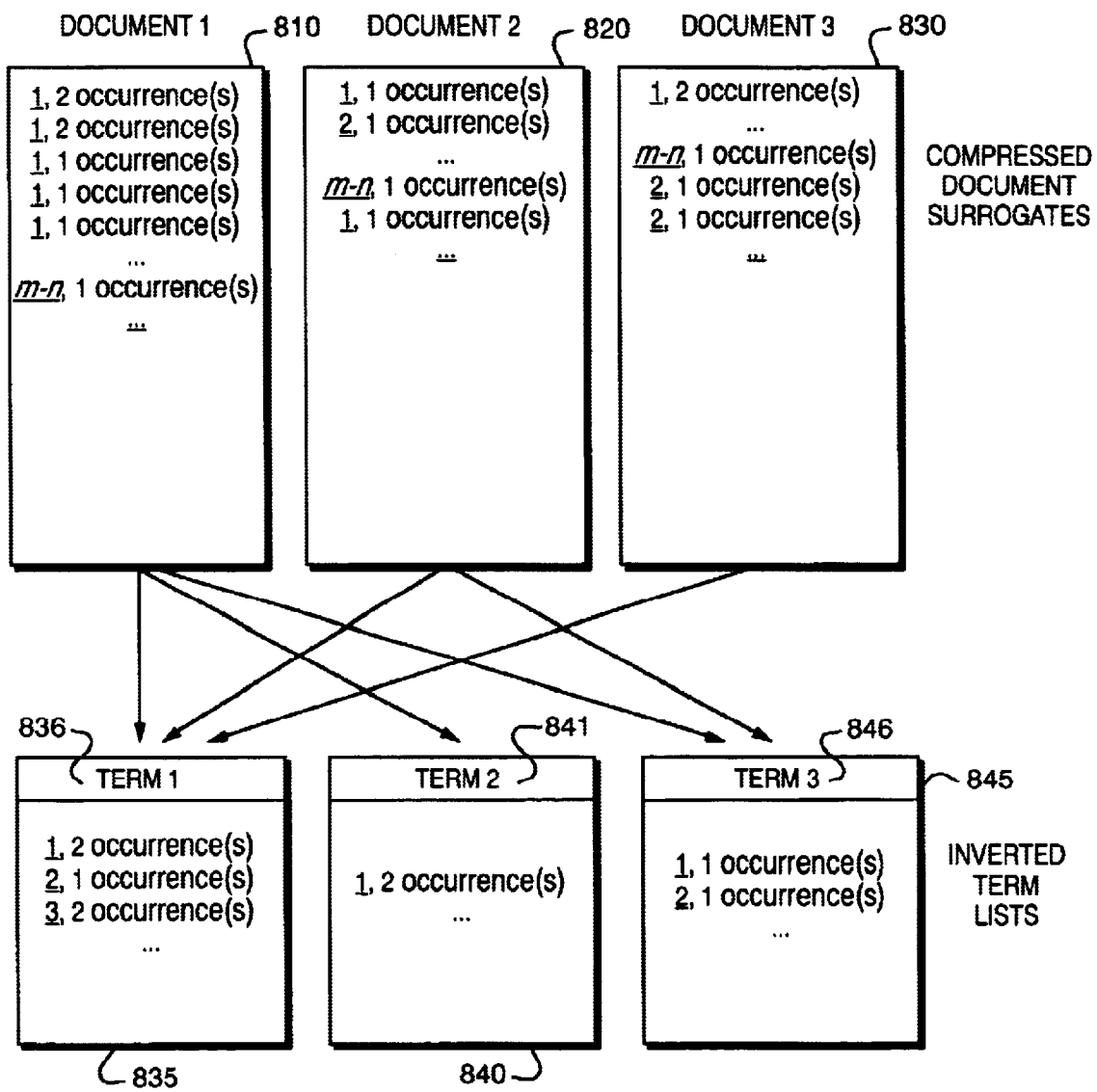
FIG. 12 illustrates a relationship between compressed document surrogates and inverted term lists according to the present invention.

The process 400 may be illustrated in a concrete case by referring to FIG. 12, which shows the relationship between compressed document surrogates and inverted term lists in the preferred embodiment discussed above. The example set forth below assumes, for purposes of the illustration, that a Document M which has been found at the step 405 to be modified is Document 2 in FIG. 12, and that one new term, Tern T, not previously in the document, has been added to the document by the modification, while Term 3, previously in the document, has been removed from the document by the modification.

In this example, in the step 410 of the process 400 of FIG. 11 a previous compressed document surrogate 820 for Document 2 is used, as shown on FIG. 12. Continuing, at the step 415 of the process 400 of FIG. 11 Term 1 is selected as the first unprocessed term, from among the terms in the previous compressed document surrogate 820 and now in the document. At the step 420 an inverted term list 835, as shown on FIG. 12, which corresponds to Term 1 is modified, to reflect the change in Document 2. For example, if Document 2 had been deleted, the reference to Document 2 in the inverted term list 835 for Term 1 is deleted. Alternatively, if the number of occurrences of Term 1 in Document 2 had changed, the entry in the inverted term list 835 for Term 1 is modified to reflect that change. In this case, however, no change has been made to the occurrences of Term 1 in Document 2, and hence the inverted term list 835 for Term 1 is not changed.

Returning now to FIG. 11, the process 400 continues at the step 425 by determining whether any terms remain in the prior compressed document surrogate for Document M or in the new Document M itself which have not yet been processed. If none remain, the process 400 ends, while if there remain unprocessed terms the process 400 returns to the step 415 to process the next remaining unprocessed term.

In the example illustrated in FIG. 12, it would be determined at the step 425 that there were terms not yet processed in the prior compressed document surrogate 820 for Document 2, or in the modified Document 2 itself, and hence the process 400 would continue. In this example, the next term chosen from among the unprocessed terms on the prior compressed document surrogate 820 for Document 2, or in the modified Document 2 itself, is Term 3 (reflecting the addition of the stored difference, "2", in the compressed document surrogate, and the prior term identification number, "1". Hence the process 400 would continue through the steps 415, 420 by updating the inverted term list 845 for Term 3 appropriately: in this case, the entry would be deleted because Term 3 no longer is in Document 2.

When the process 400 is completed, all of the inverted term lists that contained terms from the deleted or modified Document M are appropriately corrected. Thus, a user seeking to choose documents of interest by means of the inverted term lists would be conducting an analysis that was based upon current accurate information.

As stated above, the description given here has treated the case where a single inverted term list is maintained for all terms, containing information about all documents. In the case where two inverted term lists are maintained for each term, a top list and a remainder list, the two lists may be combined into a single list before processing, and then after processing is complete new top and remainder lists may be created. (This is necessary because when a document is changed it may move from the top inverted term list to the remainder list, or from the remainder list to the top list.) Alternatively, the process may be carried out without first combining the lists. If this is done, it must be determined, whenever an inverted term list is modified to reflect a change in a document, whether the change has caused the document term frequency score to change such that the document will move from one inverted term list to the other. If its score has so changed, the document must be moved from the one list to the other, and another document must be moved in the reverse direction to compensate for the change.

It may be appreciated that the method of the present invention is more efficient than the conventional method because, while the conventional method must cycle through all inverted term lists to determine which ones must be modified, the invention requires that only the inverted term lists for terms where changes may need to be made be accessed.

A further aspect of the invention which takes advantage of compressed document surrogates to facilitate carrying out search queries to return documents of interest may now be illustrated.

It is understood in the prior art that it may be useful, in ranking some or all documents in a database according to a search query, to do so by assigning each document a score according to whether or not terms specified by the user in the search query occur in the document. The ranking can further take into account matters such as where certain terms occur in relation to other terms in the document, and the relative commonness or rarity of a term in the data base as a whole. It is possible in doing this to permit the user to specify terms that are desired to be absent from a document; if this is done then the score of a document is lowered when it is found to contain such a term. One of ordinary skill in the art will be aware of other factors that may be considered in assigning scores to documents.

Conventionally, the score for a document, with respect to a given search query, is determined by searching the inverted term lists for all of the terms in the query. Because it is not known prior to beginning such a search which of the terms in the query is in the document, it is necessary to search the inverted term lists for all of the terms in the query to determine the score for a document. Finding whether a given document occurs in an inverted term list may be a relatively time-consuming process, if there are many terms in the query.

Figure 13:
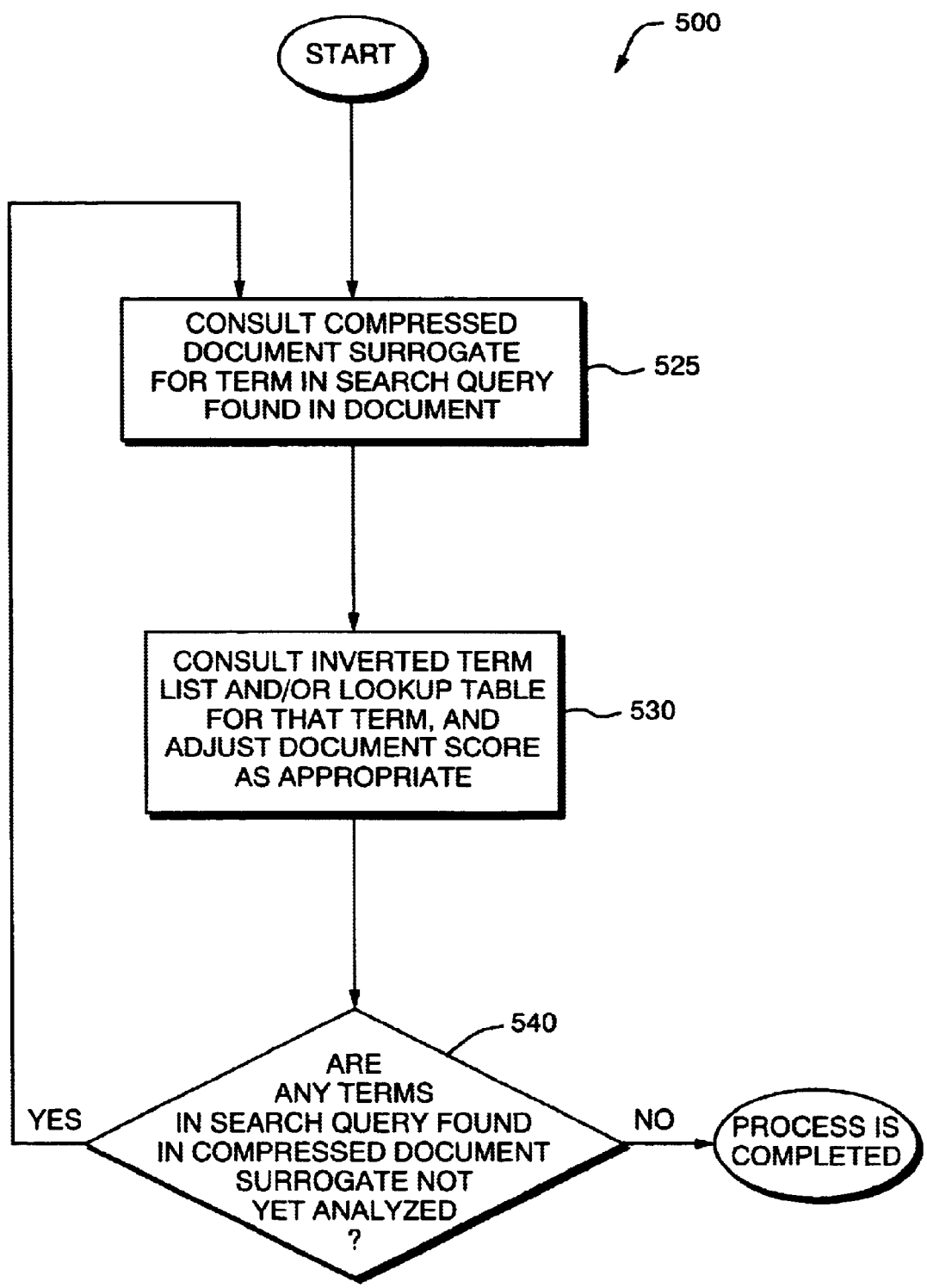
FIG. 13 is a flow chart which illustrates a process by which a document score may be calculated, using compressed document surrogates according to the present invention.

One aspect of the present invention, however, may permit a document score to be determined more quickly by the use of the document's compressed document surrogate. Referring to FIG. 13, a process 500 begins at a step 525 by examining a compressed document surrogate for a document to be scored with respect to a particular search query. A term in the search query which occurs in the document is identified by using the compressed document surrogate. Then, a step 530 calculates the score resulting from the occurrence of the term in the document by consulting, if necessary, a lookup table and/or inverted term list for the term. Then, a step 540 determines whether any other terms in the search query, which are found in the compressed document surrogate, have not yet been analyzed. If all terms in the search query that are found in the compressed document surrogate have been analyzed, the process 500 is completed. Otherwise, the process 500 continues by returning to the step 525 to choose the next term in the search query which occurs in the document and has not yet been analyzed, and then doing the appropriate calculation and adjustment of score.

In the preferred embodiment, at the step 530 it is not necessary to consult the inverted term list for the term, since the number of occurrences of the term in the document is known from the compressed document surrogate, and the remaining information necessary to calculate the document's score may be determined from the term lookup table by use of the term identification number in the compressed document surrogate, without the need to refer to the inverted term list itself.

A further aspect of the invention which takes advantage of compressed document surrogates may now be described.

One formula that is well known for use in ranking documents in order to provide documents in response to a search query is:

$$S_D = \Sigma TF_{TD} * IDF_T,$$

where: $S_D$ is the total score for a document D, $TF_{TD}$=Robertson's term frequency for Term $T = N_{TD}/(N_{TD} + K_1 + K_2*(L_D/L_0))$, where: $N_{TD}$ is the number of times the term T occurs in document D, $L_D$ is the length of document D, $L_0$ is the average length of a document in the collection of documents indexed, and $K_1$ and $K_2$ are constants. ($K_1$ typically may be assigned a value of 0.5, and $K_2$ 1.5, but these values may be varied without departing from the spirit and scope of the invention.) and $IDF_T = \log((N+K_3)/N_T)/\log(N+K_4)$ where:

N is the number of documents in the collection, $N_T$ is the number of documents containing the term T in the collection, $K_3$ and $K_4$ are constants. ($K_3$ typically may be assigned a value of 0.5, and $K_4$ 1.0, but these values may be varied without departing from the spirit and scope of the invention.).

This particular formula is by no means the only formula that may be used; others will be apparent to one of ordinary skill in the art. This formula among others takes advantage of the fact that a "rare" term is a more powerful predictor of document utility than a common term, by giving greater weight in ranking documents to those that occur relatively less often in the collection. For example, if a user wishes to find documents referring to osteoporosis in women, the term "osteoporosis" alone, if it occurs in the document collection in fewer documents than the term "women," may be of more utility as a filter than the term "women." However, it may also be true that, among documents which refer to osteoporosis, those that also mention women are more likely to be useful than those that do not. Hence, the formula does not exclude the common term from the search process entirely.

(Although this formula as written does not permit a user to specify terms he wishes to be absent from the documents, other formulas do so by appropriately taking their presence into account by subtracting a quantity from the score. For example, one could specify that one wished to see documents referring to "osteoporosis" and "women," but not documents that also referred to "elderly," if one wished to exclude documents that discussed osteoporosis in relation to elderly women.)

According to the invention, it is possible to reduce the time taken to analyze a search query consisting of a set of terms desired to be contained in documents, and return a ranked list of N responsive documents containing some or all of the desired terms, by using compressed document surrogates.

Figure 14:
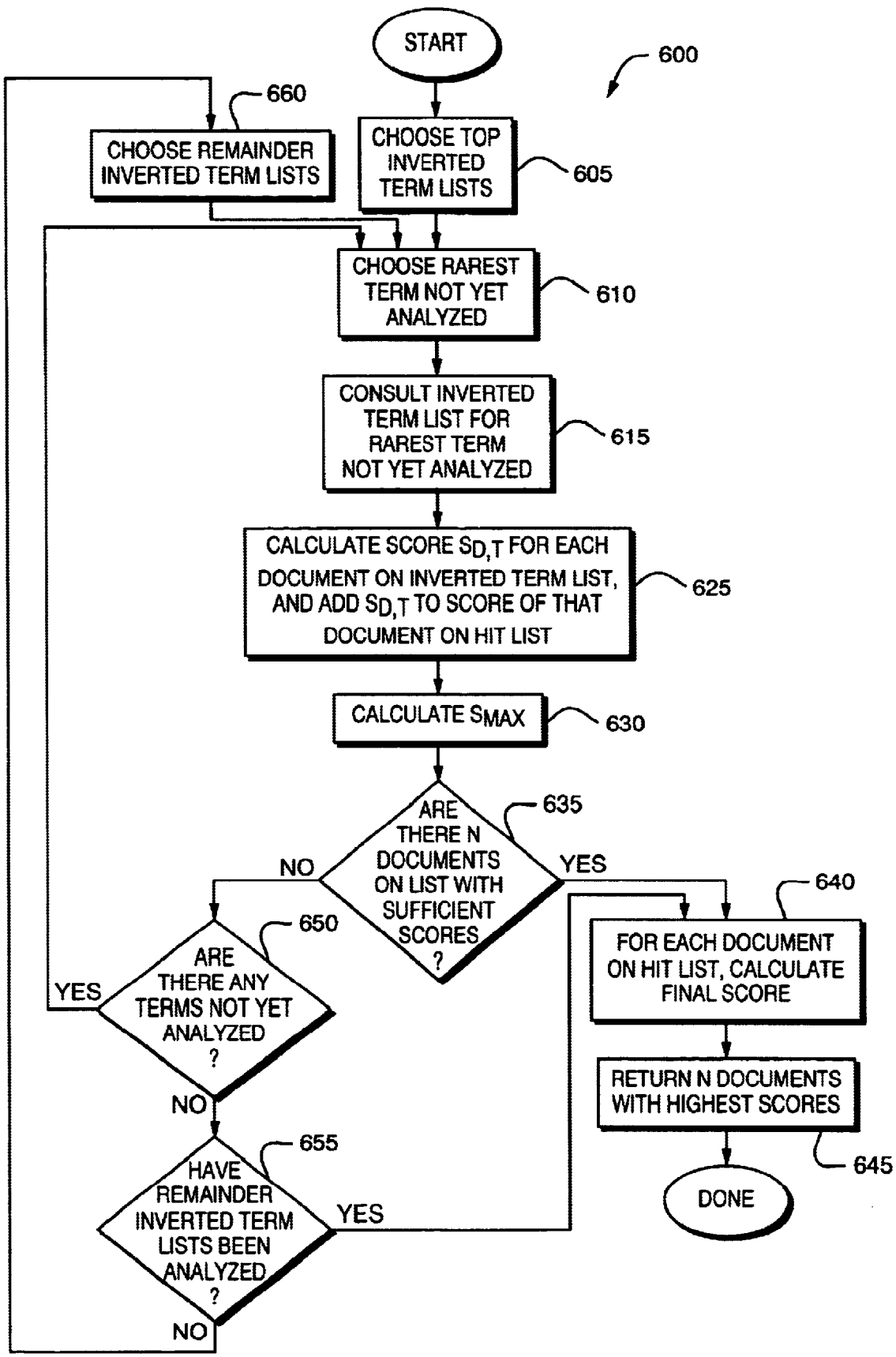
FIG. 14 is a flow chart which illustrates a process by which a search query may be carried out, using compressed document surrogates according to the present invention.

Referring to FIG. 14, a preferred embodiment for doing so is illustrated. A process 600 begins with a step 605 wherein it is determined to begin using top inverted term lists for the terms in the query.

According to FIG. 14, the process 600 then iterates until a sufficient number of candidate documents for inclusion in the final ranking of N documents is generated.

The iterative portion of the process 600 begins at a step 610 by choosing, from among those terms which are specified as being desired in the query, the rarest term whose top inverted term list has not yet been analyzed. Documents may be ranked in order of rareness using any one of a number of measures which will be known to those of ordinary skill in the art. In the preferred embodiment discussed here, the ranking is done by using $N_T$, the document frequency of the term T in the collection, which is the number of documents in the collection in which the Term T appears.

At a step 615, a top inverted term list for that rarest not-yet-analyzed desired term is examined. In the embodiment illustrated herein, the top list contains one thousand documents, but the number of documents may vary according to a variety of functional factors familiar to one of ordinary skill in the art, such as the total number of documents of potential interest.

The process 600 then continues at a step 625 by calculating, for each document D on the top inverted term list for the term T, the score $S_{TD}$ resulting from its containing the term, where:

$$S_{TD} = TF_{TD} * IDF_T,$$

where: $TF_{TD}$=Robertson's term frequency for Term $T=N_{TD}/(N_{TD}+K_1+K_2*(L_D/L_0))$, where: $N_{TD}$ is the number of times the term T occurs in document D, $L_D$ is the length of document D, $L_0$ is the average length of a document in the collection of documents indexed, and $K_1$ and $K_2$ are constants. ($K_1$ typically may be assigned a value of 0.5, and $K_2$ 1.5, but these values may be varied without departing from the spirit and scope of the invention.) and $IDF_T=\log((N+K_3)/N_T)/\log(N+K_4)$ where:

N is the number of documents in the collection, $N_T$ is the number of documents containing the term T in the collection, $K_3$ and $K_4$ are constants. ($K_3$ typically may be assigned a value of 0.5, and $K_4$ 1.0, but these values may be varied without departing from the spirit and scope of the invention.)

If a document D for which a score $S_{D,T}$ has been calculated has not previously been found on an inverted term list in the process 600, the document is added to a list L of candidate documents. If the document has been found on an inverted term list previously in the process 600, the document's prior score is adjusted by adding $S_D$, T to the prior score.

After this is done, the process 600 continues at a step 630 by calculating the maximum number of points that could be scored by a document not yet found to contain any analyzed term. (That is, a document that contains all of the desired terms not yet analyzed.) That maximum potential score $S_{Max}$ is the sum, over all the desired terms whose hit lists have not yet been analyzed:

$$S_{Max-\Sigma TFMax} * IDF_T,$$

where: $TF_{Max}$=Robertson's maximum term frequency for Term T $$=MAX(N_{TD}/(N_{TD}+K_1+K_2*(L_D/L_0))),$$

where: $N_{TD}$ is the number of times the term T occurs in document D, $L_D$ is the length of document D, $L_0$ is the average length of a document in the collection of documents indexed, and $K_1$ and $K_2$ are constants. ($K_1$ typically may be assigned a value of 0.5, and $K_2$ 1.5, but these values may be varied without departing from the spirit and scope of the invention.) and $IDF_T=\log((N+K_3) N_T)/\log(N+K_4)$ where:

N is the number of documents in the collection, $N_T$ is the number of documents containing the term T in the collection, $K_3$ and $K_4$ are constants. ($K_3$ typically may be assigned a value of 0.5, and $K_4$ 1.0, but these values may be varied without departing from the spirit and scope of the invention.)

At a next step 635, it is determined whether there are already N documents on the list L whose scores exceed $S_{Max}$, the maximum number of points that could be accrued by a document not found on any of the top inverted term lists yet analyzed. If there are N or more such documents, it is unnecessary to look for any further documents by searching the top inverted term lists of the (relatively more common) terms not yet analyzed, and a next step 640 in the process 600 calculates a final score for all of the already-located documents on the list L, so that their rankings may be adjusted to account for the documents containing the more common terms, and a final list of the top N documents may be prepared.

At the step 640, in calculating the final scores for the candidate documents on the list L the process 600 may take advantage of that aspect of the invention previously discussed which permits the score of a document to be determined by use of its compressed document surrogate. The process then concludes at a step 645 by ranking the documents on the list L according to the scores of the documents, and returning as its result the N documents which have the highest scores, ranked in order of the scores.

If it is determined at the step 635 that there are not N documents already found whose scores exceed the scores that could be achieved by not-yet-located documents, then the process continues at a step 650 to determine if there are any terms in the search query whose top inverted term lists have not yet been analyzed.

If the process 600 determines at the step 650 that not all terms have had their top inverted term lists analyzed, then the process 600 continues by returning to the step 611 to begin analyzing the rarest desirable term not yet analyzed.

If all terms in the search query have had their top inverted term lists analyzed, then the process 600 proceeds to a step 655. When the process 600 reaches the step 655 after processing top inverted term lists, it is concluded that remainder inverted term lists have not yet been analyzed, and the process 600 proceeds to a step 660. (The path the process 600 will follow when the step 655 is reached after the remainder inverted term lists have been analyzed will be discussed below.)

In the process 600 at the step 660 it is concluded that remainder inverted term lists will now be processed, and control passes to the step 610.

At the step 610, the iterative process of considering the rarest term whose inverted term list has not yet been analyzed begins again, this time considering the remainder inverted term lists. The process 600 cycles through the remainder inverted term lists at steps 615, 625 adding documents to the list L, and increasing the scores of the documents already on the list L, as documents are found on the remainder inverted term lists. As before, after each inverted term list is processed at the step 630 a new $S_{Max}$ is determined. In doing this for the remainder term lists, the maximum term frequency scores again may be determined in the preferred embodiment from the lookup table, but they are not the same maximum term frequency scores as were used for the top inverted term lists. Instead, the lookup table maintains a list of maximum term frequency scores for terms, for documents found in the remainder lists for the terms.

At the step 635 it is determined whether further inverted term lists need to be processed, or whether a sufficient number of documents have been found with sufficiently high scores that no further lists need be searched.

Ultimately, if it is concluded that a sufficient number of documents with sufficiently high scores as described above have been located, then from the step 635 control passes to the step 640, and as described above final scores are calculated, and a final list of N documents with the highest scores is returned, ranked in order of score.

However, if the process 600 proceeds to complete the iterations through all of the remainder inverted term lists without generating a sufficient number of documents with sufficiently high scores, then after the step 635 control passes through the step 650, where it is determined that there are no terms left whose remainder inverted term lists have not yet been processed, to the step 655, where it is determined that because the remainder term lists have been processed, control is to pass to the step 640 to begin the final processing. If the step 640 is reached after the remainder inverted term lists have all been processed, the final scores of the documents on the list L are calculated, and control passes to the step 645 to rank the documents that have been located in order, except that the process returns fewer than N documents.

While the preferred embodiment described here only considers search queries containing terms desired to be found in documents, the process may also be applied in the case of search queries containing undesired documents. If this is to be done, then at the step 630 in addition to calculating $S_{Max}$, the maximum number of points that could be accrued by a document not found on any of the top inverted term lists yet analyzed, a further sum $S_{Sub}$ is calculated, according to the same methodology, which consists of the maximum number of points which could be subtracted from a document if it is found to contain all of the undesirable terms which have not yet been analyzed. In addition, in the step 635 where it is determined if there are sufficient documents with sufficiently high scores such that no further inverted term lists need to be searched, the requirement is that there be N documents whose scores exceed $S_{Max}+S_{Sub}$, rather than that there be N documents whose scores exceed $S_{Max}$. In addition, in calculating final scores for documents, the contribution of the undesirable terms to the score must be considered at the step 640 along with the contribution of the desired terms.

A further aspect of the invention that takes advantage of compressed document surrogates may now be considered. An aspect of the present invention that has previously been discussed provides for improving the accuracy of searches for documents, such as but not limited to Web pages or sites, by reviewing a limited number of the highest-ranked documents returned for relevance, and then modifying the search query based upon that review. That process, as well as any other technique for generating or modifying a search query, can be performed by utilizing compressed document surrogates.

In particular, referring to FIG. 6, the process 200 for iteratively improving the accuracy of a document list includes the step 210 wherein the sorting criteria is modified based upon the grading of certain documents on the list as relevant or not relevant. Conventionally, modifying the sorting criteria would require analyzing the documents themselves, to determine what terms do or do not occur in them, and how often, and where. Such resort to the actual documents may be time consuming. It would be possible to avoid recourse to the documents themselves by searching all inverted term lists to determine in which lists a given document occurs. However, such a search process also would be extremely time consuming.

Using the compressed document surrogates as the present invention permits, however, may provide a more efficient way to modify the sorting criteria without requiring recourse either to the original documents or to all inverted term lists. Under this aspect of the present invention, the compressed document surrogate for each document that has been graded may be consulted to determine what terms occur in the document. Then, only the limited number of inverted term lists for the terms thus identified as useful need to be consulted, or the information necessary may be found from the lookup table associated with the inverted term list.

A further aspect of the present invention permits the efficient performance of local context analysis algorithms, by use of compressed document surrogates. Local context analysis is a technique for attempting to improve the performance of search query techniques by automatically expanding a query, based upon an analysis of the terms initially therein, and the addition to the query of additional terms that are frequently found in association with a group of the terms initially included in the query.

In order to carry out the analysis which underlies these techniques, other terms frequently found in documents in the collection in association with the terms initially included in the inquiry are identified. Conventionally, this could be determined by review of the underlying documents in the collection. Such a review would be extremely inefficient, where the documents are Web pages or sites.

An aspect of the present invention permits local context analysis to be carried out without the need to review the underlying Web pages or sites. When it is desired to determine what other terms are frequently found in association with a given group of terms in documents in the collection, under the present invention the compressed document surrogates for the documents in the collection may be consulted. Each surrogate will identify every term of interest in its underlying document, and will also refer to the lookup table where further information about the term may be found, including the address of the inverted term list for the term. Thus, analysis of the relationships between terms may be carried out by use of the compressed document surrogates, and associated lookup table and inverted term lists, without the need to refer to the underlying documents themselves.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for maintaining information about documents in a database, the method comprising:
   (a) creating a compressed document surrogate corresponding to each document that is part of a collection of documents of interest in said database, so as to identify terms occurring in said each document that is part of said collection;
   (b) inserting in said compressed document surrogate information about terms which occur in said each document that is part of said collection, and,
   (c) creating at least one inverted term list corresponding to at least one selected term of interest which occurs in said database, said at least one inverted term list including: at least one document identifier number to uniquely identify a selected document in said database, and corresponding information indicating how often said selected term of interest occurs in said selected document.

2. The method of claim 1, where the documents consist of Web pages.

3. The method of claim 1, where the documents consist of Web sites.

4. The method of claim 1, where the compressed document surrogates and inverted term lists contain information about the same terms.

5. The method of claim 1, where the terms about which the compressed document surrogates and inverted term lists contain information are all terms which occur in the database.

6. The method of claim 1, where the terms about which the compressed document surrogates and inverted term lists contain information are a subset of all terms, excluding common words.

7. The method of claim 1, where the information about each term included in a compressed document surrogate for a document, includes at least one of: a term identification number, a location in a lookup table of an entry for the term, an address of an inverted term list of the term, an address of a location in the inverted term list for the term of the document, a number of times the term occurs in the document, and a location in the document of each occurrence of the term.

8. The method of claim 1, where the information about each term included in a compressed document surrogate for a document includes a term identification number for each term found in the document.

9. The method of claim 8, where the information about each term included in a compressed document surrogate for a document includes the number of occurrences of the term in the document.

10. The method of claim 8, where the terms are stored in the compressed document surrogate in term identification number order.

11. The method of claim 10, where the term identification number of a term in the compressed document surrogate is given relative to the term identification number of the prior term in the document.

12. The method of claim 11, where information about terms is stored in a lookup table which is a fixed array in which information about terms is stored in term identification number order.

13. The method of claim 12, where the information the lookup table stores includes at least one of: the term in a natural language, the address of the inverted term list of the term, the number of documents in the database which contain the term, and the maximum term frequency score for any document on any inverted term list for the term.

14. The method of claim 12, where the information the lookup table stores includes the term in a natural language, the address of the inverted term list of the term, the number of documents in the database which contain the term, and the maximum term frequency score for any document on any inverted term list for the term.

15. The method of claim 1, where there are two inverted term lists for each term: a top inverted term list containing information about the documents which contain the term most frequently, and a remainder inverted term list containing information about all other documents which contain the term.

16. A device for maintaining information about documents in a database, the device comprising:
   (a) means for creating a compressed document surrogate corresponding to each document that is part of a collection of documents of interest in said database, so as to identify terms occurring in said each document that is part of said collection;
   (b) means for inserting in said compressed document surrogate information about terms which occur in said each document that is part of said collection, and,
   (c) means for creating at least one inverted term list corresponding to at least one selected term of interest which occurs in said database, said at least one inverted term list including: at least one document identifier number to uniquely identify a selected document in said database, and corresponding information indicating how often said selected term of interest occurs in said selected document.

17. The device of claim 16, where the documents consist of Web pages.

18. The device of claim 16, where the documents consist of Web sites.

19. The device of claim 16, where the compressed document surrogates and inverted term lists contain information about the same terms.

20. The device of claim 16, where the terms about which the compressed document surrogates and inverted term lists contain information are all terms which occur in the database.

21. The device of claim 16, where the terms about which the compressed document surrogates and inverted term lists contain information are a subset of all terms, excluding common words.

22. The device of claim 16, where the information about each term included in a compressed document surrogate for a document, includes at least one of: a term identification number, a location in a lookup table of an entry for the term, an address of an inverted term list of the term, an address of a location in the inverted term list for the term of the document, a number of times the term occurs in the document, and a location in the document of each occurrence of the term.

23. The device of claim 16, where the information about each term included in a compressed document surrogate for a document includes a term identification number for each term found in the document.

24. The device of claim 23, where the information about each term included in a compressed document surrogate for a document includes the number of occurrences of the term in the document.

25. The device of claim 23, where the terms are stored in the compressed document surrogate in term identification number order.

26. The device of claim 25, where the term identification number of a term in the compressed document surrogate is given relative to the term identification number of the prior term in the document.

27. The device of claim 26, where information about terms is stored in a lookup table which is a fixed array in which information about terms is stored in term identification number order.

28. The device of claim 27, where the information the lookup table stores includes at least one of: the term in a natural language, the address of the inverted term list of the term, the number of documents in the database which contain the term, and the maximum term frequency score for any document on any inverted term list for the term.

29. The device of claim 27, where the information the lookup table stores includes the term in a natural language, the address of the inverted term list of the term, the number of documents in the database which contain the term, and the maximum term frequency score for any document on any inverted term list for the term.

30. The device of claim 16, where there are two inverted term lists for each term: a top inverted term list containing information about the documents which contain the term most frequently, and a remainder inverted term list containing information about all other documents which contain the term.

\* \* \* \* \*